(12) United States Patent
Mandalakas et al.

(10) Patent No.: US 7,834,480 B2
(45) Date of Patent: Nov. 16, 2010

(54) ENERGY CONVERTER SYSTEM WITH REACTIVE-POWER-MANAGEMENT

(75) Inventors: John N. Mandalakas, North Huntingdon, PA (US); David J. Shero, South Park Township, PA (US)

(73) Assignee: Mesta Electronics, Inc., North Huntingdon, PA (US)

( * ) Notice: Subject to any disclaimer, the term of this patent is extended or adjusted under 35 U.S.C. 154(b) by 192 days.

(21) Appl. No.: 12/143,259

(22) Filed: Jun. 20, 2008

(65) Prior Publication Data

US 2008/0315685 A1 Dec. 25, 2008

Related U.S. Application Data

(60) Provisional application No. 60/945,131, filed on Jun. 20, 2007.

(51) Int. Cl.
*H02J 1/12* (2006.01)
(52) U.S. Cl. ...................................................... 307/46
(58) Field of Classification Search .................... 307/46
See application file for complete search history.

(56) References Cited

U.S. PATENT DOCUMENTS

| | | | |
|---|---|---|---|
| 4,868,481 A | 9/1989 | Owen | |
| 5,321,598 A | 6/1994 | Moran | |
| 5,329,221 A | 7/1994 | Schauder | |
| 5,351,178 A | 9/1994 | Brennen et al. | |
| 5,351,181 A | 9/1994 | Brennen et al. | |
| 5,355,025 A | 10/1994 | Moran et al. | |
| 5,397,927 A | 3/1995 | Suelzle et al. | |
| 5,519,600 A | 5/1996 | Ahladas | |
| 5,552,980 A | 9/1996 | Garces et al. | |
| 5,567,994 A | 10/1996 | Davis et al. | |
| 5,619,079 A | 4/1997 | Wiggins et al. | |
| 5,625,539 A | 4/1997 | Nakata et al. | |
| 5,642,007 A * | 6/1997 | Gyugyi et al. | ............. 307/102 |
| 5,780,939 A | 7/1998 | Christl et al. | |
| 5,977,660 A * | 11/1999 | Mandalakas et al. | ......... 307/105 |

\* cited by examiner

*Primary Examiner*—Michael Rutland Wallis
(74) *Attorney, Agent, or Firm*—The Webb Law Firm

(57) ABSTRACT

A distributed generation system is connected to an AC power line that provides AC electrical power from a source to a load. The distributed generation system includes a DC electrical power source, a capacitor for storing DC electrical power, a converter for converting electrical power stored in the DC electrical power source at a first voltage to a second, greater voltage for storage in the capacitor. The system includes an inverter for inverting the electrical power stored in the capacitor at the second voltage into AC electrical power having a peak voltage less than the second voltage. A controller is provided and operative for controlling the operation of the converter and the inverter to deliver electrical power stored in the DC electrical power source to the capacitor for delivery as AC electrical power to the AC power line.

20 Claims, 22 Drawing Sheets

|   | COLUMN 1 | COLUMN 2 |
|---|---|---|
| 1.) | LINE_VOLT AB/BC/CA= 489.3/495.2/490.8 | DPM_AMPS A/ B/ C = 25.6/ 17.0/ 19.8 |
| 2.) | LINE_AMPS A/ B/ C = 44.7/ 44.1/ 43.7 | LOAD_AMPS A/ B/ C = 50.5/ 40.1/ 52.4 |
| 3.) | LINE_THDR% A/ B/ C = 2.1/ 1.9/ 2.9 | LOAD_THDR% A/B/ C = 32.1/ 32.6/ 32.3 |
| 4.) | LINE_AMPS HARMONIC= 0.9/ 1.8/ 1.3 | LOAD_AMPS HARMONIC = 16.3/ 13.1/ 17.0 |
| 5.) | LINE_PWR KW/KVA/PF= 37.6/ 37.6/0.999 | LOAD_PWR KW/KVA/PF = 36.8/ 40.6/0.904 |
| 6.) | LINE_FREQUENCY (HZ)= 59.98 | DC_VOLT (LO+HI=SUM) = 408.7+410.9=819.7 |
| 7.) | MODE = ON - INV(S) 1    ENABLED | STATUS = FULLY OPERATIONAL |
| 8.) | TEMP PCB/HS1A/HS1B= 25.9/ 26.9/ 27.6 | BATTERY V/I/KW = 501.6/ 1.0/ 0.0 |
| 9.) | WREQ/WACT/BATTCHRG= 0/ 0/ 50% | |

FULL REACTIVE CURRENT CORRECTION WITH NO REAL POWER COMPONENT

FIG. 11

| | COLUMN 1 | COLUMN 2 |
|---|---|---|
| 1.) | LINE_VOLT AB/BC/CA= 490.9/496.8/492.3 | DPM_AMPS A/ B/ C = 28.8/ 16.9/ 27.2 |
| 2.) | LINE_AMPS A/ B/ C = 31.3/ 30.8/ 30.3 | LOAD_AMPS A/ B/ C = 50.3/ 40.5/ 52.7 |
| 3.) | LINE_THDR% A/ B/ C = 2.7/ 3.0/ 4.3 | LOAD_THDR% A/B/ C = 32.3/ 32.5/ 32.3 |
| 4.) | LINE_AMPS HARMONIC= 0.9/ 0.9/ 1.3 | LOAD_AMPS HARMONIC = 16.2/ 13.2/ 17.0 |
| 5.) | LINE_PWR KW/KVA/PF= 26.3/ 26.3/0.999 | LOAD_PWR KW/KVA/PF = 36.8/ 40.9/0.901 |
| 6.) | LINE_FREQUENCY (HZ)= 59.99 | DC_VOLT (LO+HI=SUM) = 407.6+410.9=818.6 |
| 7.) | MODE = ON - INV(S) 1   ENABLED | STATUS = FULLY OPERATIONAL |
| 8.) | TEMP PCB/HS1A/HS1B= 26.8/ 33.3/ 38.2 | BATTERY V/I/KW = 447.9/ 25.9/ 11.6 |
| 9.) | WREQ/WACT/BATTCHRG= 50/ 50/ 8% | |

FULL REACTIVE CURRENT CORRECTION WITH 11.6KW OF POWER GENERATION

FIG. 12

| | COLUMN 1 | COLUMN 2 |
|---|---|---|
| 1.) LINE_VOLT AB/BC/CA= | 489.5/495.4/491.0 | |
| 2.) LINE_AMPS A/ B/ C = | 47.6/ 47.1/ 46.7 | DPM_AMPS A/ B/ C = 25.7/ 18.6/ 19.2 |
| 3.) LINE_THDR% A/ B/ C = | 1.5/ 1.6/ 2.3 | LOAD_AMPS A/ B/ C = 50.5/ 40.2/ 52.3 |
| 4.) LINE_AMPS HARMONIC= | 0.8/ 0.8/ 1.1 | LOAD_THDR% A/B/ C = 32.2/ 32.7/ 32.5 |
| 5.) LINE_PWR KW/KVA/PF= | 40.2/ 40.2/0.999 | LOAD_AMPS HARMONIC = 16.3/ 13.2/ 17.0 |
| 6.) LINE_FREQUENCY (HZ)= | 59.99 | LOAD_PWR KW/KVA/PF = 36.8/ 40.6/0.904 |
| 7.) MODE = ON - INV(S) 1 | ENABLED | DC_VOLT (LO+HI=SUM) = 408.2+411.4=819.5 |
| 8.) TEMP PCB/HS1A/HS1B= | 26.8/ 33.9/ 38.6 | STATUS = FULLY OPERATIONAL |
| 9.) WREQ/WACT/BATTCHRG= | - 1/ - 1/ 5% | BATTERY V/I/KW = 503.6/- 4.9/- 2.5 |

FULL REACTIVE CURRENT CORRECTION WITH 2.5KW OF BATTERY CHARGING

FIG. 13

| | COLUMN 1 | COLUMN 2 |
|---|---|---|
| 1.) LINE_VOLT AB/BC/CA= | 490.3/495.9/491.1 | |
| 2.) LINE_AMPS A/ B/ C = | 49.6/ 39.3/ 50.6 | DPM_AMPS A/ B/ C = 16.2/ 13.1/ 17.0 |
| 3.) LINE_THDR% A/ B/ C = | 1.3/ 1.6/ 1.6 | LOAD_AMPS A/ B/ C = 51.4/ 40.5/ 53.2 |
| 4.) LINE_AMPS HARMONIC= | 0.7/ 0.6/ 0.8 | LOAD_THDR% A/B/ C = 31.5/ 32.5/ 32.1 |
| 5.) LINE_PWR KW/KVA/PF= | 38.0/ 39.6/0.958 | LOAD_AMPS HARMONIC = 16.2/ 13.2/ 17.1 |
| 6.) LINE_FREQUENCY (HZ)= | 59.98 | LOAD_PWR KW/KVA/PF = 37.3/ 41.2/0.905 |
| 7.) MODE = REDUCED PF - INV(S) | 1    ON | DC_VOLT (LO+HI=SUM) = 408.0+411.4=819.4 |
| 8.) TEMP PCB/HS1A/HS1B= | 26.9/ 34.1/ 39.1 | STATUS = FULLY OPERATIONAL |
| 9.) WREQ/WACT/BATTCHRG= | 0/ 0/ 45% | BATTERY V/I/KW = 514.6/ 0.0/ 0.0 |

HARMONIC CURRENT CORRECTION ONLY WITH NO REAL POWER COMPONENT

FIG. 14

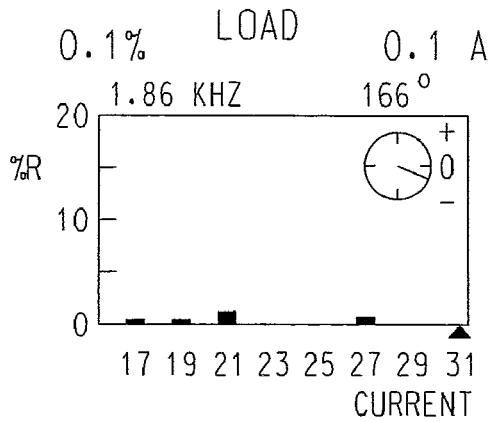
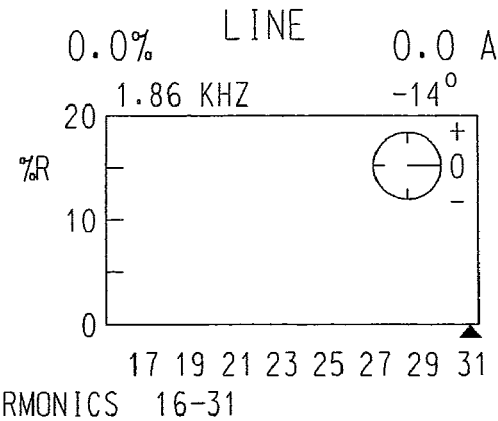

LOAD
- RMS CURRENT: 49.5 A RMS
- PEAK CURRENT: 89.0 A PK
- DC AMPS: −0.2 A DC
- TOTAL HARMONIC DISTORTION: 32.4 %THD-R
- CREST FACTOR: 1.80 CF

FIG. 19A

LINE
- RMS CURRENT: 43.1 A RMS
- PEAK CURRENT: 61.2 A PK
- DC AMPS: −0.3 A DC
- TOTAL HARMONIC DISTORTION: 1.2 %THD-R
- CREST FACTOR: 1.42 CF

FIG. 19B

LOAD
- POWER KW: 11.9 KW
- POWER KVA: 13.9 KVA
- POWER FACTOR: 0.86 PF
- DISPLACEMENT POWER FACTOR: 0.90 DPF
- KVAR: 5.6 KVAR A LAG

FIG. 20A

LINE
- POWER KW: 12.1 KW
- POWER KVA: 12.1 KVA
- POWER FACTOR: 1.00 PF
- DISPLACEMENT POWER FACTOR: 1.00 DPF
- KVAR: 0.1 KVAR A LAG

FIG. 20B

ENERGY CONVERTER SYSTEM WITH REACTIVE-POWER-MANAGEMENT

CROSS REFERENCE TO RELATED APPLICATION

The present application claims priority from U.S. provisional application No. 60/945,131, filed Jun. 20, 2007, which is incorporated herein by reference.

BACKGROUND OF THE INVENTION

Presently, many electrical power distribution circuits have areas that are supplied with substandard power. This may take the form of voltages being out of tolerance and/or a distribution circuit being overloaded. These problems result from the impedance (real or reactive) between the generating plant and the load being higher than what is desired. If the problem is severe enough, failures in the distribution circuit will occur. Distorted or out-of-tolerance voltages supplied to end-users may also result in end-user equipment over-heating and subsequent failure.

There are several causes of these problems. Additional loads being added to the distribution circuit, or the movement of loads over time, may cause portions of distribution circuit to become overloaded. The tendency for end-user's loads to be inductive, in addition to the natural inductive nature of a typical distribution circuit, can cause significant out-of-phase 60 Hz reactive power to exist in the distribution circuit. This reactive power does not contribute to any real work being performed, but does result in unwanted power losses in the distribution circuit.

Unbalanced loading of the 3 phases of the distribution circuit, caused by single phase loads that are not evenly distributed between the 3 phases, can cause one or more of the phases to be overloaded while the other phase(s) are below capacity. This current imbalance will result in unequal voltages between the phases. In addition, the overloaded phase(s) may eventually cause a failure in the distribution circuit by overheating a component thereof.

Non-linear loads, such as motor drives, computers, fluorescent lighting and the like, draw harmonic currents. The distribution circuit must supply these harmonic currents, which are at higher frequencies such as 180 Hz, 300 Hz, 420 Hz, 540 Hz, 660 Hz, etc. (i.e., odd ordered harmonics of 60 Hz), and again do not contribute to any real work. These higher frequency harmonic currents flowing through the distribution system result in skin effect, proximity effect, and eddy current power losses in components of the distribution circuit. If these harmonic currents exist at significant levels, overheating and failure of one or more components of the distribution circuit can occur. Since the distribution circuit is inductive in nature and the impedance of the distribution circuit increases with increased frequency, there can be significant voltage drops in the circuit that results in distorted voltages. These distorted voltages result in additional heating in some loads, such as AC motors, which could lead to premature failures in such loads.

These problems can be reduced, but not eliminated, by increasing the size of components in the distribution circuit. This, however, is an expensive proposition (in both monetary terms and in terms of increased need for larger components in the distribution circuit), especially if the heavier loads are a significant distance from the generating facility. In such a case, a large portion of the distribution circuit may need to be upgraded. Even with such upgrading, there may still be locations along the distribution circuit that have distorted or substandard voltage levels. Also, future load shifts can occur that can render these improvements suboptimal or obsolete.

SUMMARY OF THE INVENTION

Disclosed is a distributed generation system that is connectable to an AC power line that provides AC electrical power from a source to a load. The distributed generation system includes a source of stored DC energy; a controller operative for: detecting line voltage and line current of the AC power line and for providing a first set of firing signals related to the AC line voltage and/or the AC line current, and detecting an amount of energy stored in the source of stored DC energy and for providing a second set of firing signals related thereto; an inverter connected between the power line and the source of stored DC enemy and connected to receive the first set of firing signals from the controller; a DC power source; and a converter connected between the DC power source and the source of stored DC energy and connected to receive the second set of firing signals from the controller, wherein the controller is operative for controlling the firing of the first and second sets of firing signals to either deliver electrical power from the DC power source to the AC power line, or vice versa, via the source of stored DC energy. The controller is further operative for controlling the firing of the first and second sets of firing signals to maintain the source of stored DC energy at a voltage greater than a peak AC line voltage and a voltage of the DC power source.

The controller can be further operative for causing the inverter to perform at least one of the following: reduce load induced phase shifts between the line voltage and the line current; reduce line current harmonics; or balance currents in AC power lines of a polyphase AC electrical distribution system.

The distributed generation system can include means for filtering connected between the inverter and the power line for filtering out signals caused by operation of the inverter that are not related to reducing load induced phase shifts between the line voltage and the line current, reducing line current harmonics, and/or balancing currents in the AC power lines of a polyphase AC electrical distribution system.

The distributed generation can include a transformer connected between the inverter and the power line for physically isolating the inverter from the power line while enabling the inverter and the power line to be in electrical communication.

During delivery of electrical power from the source of DC power source to the AC power line, the controller can control the first and second sets of firing signals to cause the inverter to deliver the electrical power stored on the source of stored DC energy to the AC power line and to cause the converter to deliver electrical power from the DC power source to the source of stored DC energy.

The source of stored DC energy can include a capacitor. The DC power source can include a battery.

Also disclosed is a distributed generation system connectable to an AC power line that provides AC electrical power from a source to a load. The distributed generation system includes means for storing DC electrical power at a first voltage; means for inverting DC electrical power stored by the means for storing DC electrical power into AC electrical power that is delivered to the AC power line and for converting AC electrical power on the AC power line into DC electrical power for storage by the means for storing DC electrical power; means for generating DC electrical power at a second voltage; and means for converting the second voltage of the means for generating DC electrical power to the first voltage of the means for storing DC electrical power and vice versa, wherein the first voltage is greater than the second voltage and a peak voltage of the AC electrical power that is delivered to the AC power line.

The distributed generation system can include means for controlling the operation of the means for inverting to controllably transfer electrical power to or from the means for storing DC electrical power in a manner to reduce load induced phase shifts between the line voltage and the line current, reduce line current harmonics on the AC power line or balance currents in AC power lines of a polyphase AC electrical distribution system.

The distributed generation system can include means for controlling the operation of the means for converting to controllably transfer electrical power to or from the means for storing DC electrical power in a manner to maintain the first voltage within a predetermined limit.

The means for storing DC electrical power can include a capacitor. The means for generating DC electrical power can include a battery.

The distributed generation system can include means for physically isolating the means for inverting from the AC power line while enabling the means for inverting and the AC power line to be in electrical communication The distributed generation system can include means for filtering signals caused by operation of means for inverting that are not related to reducing load induced phase shifts between the line voltage and the line current, reducing line current harmonics, and/or balancing currents in the AC power lines of a polyphase AC electrical distribution system.

Lastly, disclosed is a distributed generation system connectable to an AC power line that provides AC electrical power from a source to a load. The distributed generation system includes a DC electrical power source; means for storing DC electrical power; a converter operative for converting electrical power stored in the DC electrical power source at a first voltage to a second, greater voltage for storage in the means for storing DC electrical power; an inverter operative for converting electrical power stored in the means for storing DC electrical power at the second voltage into AC electrical power having a peak voltage less than the second voltage; and a controller operative for controlling the operation of the converter and the inverter to deliver electrical power stored in the DC electrical power source to the means for storing DC electrical power for delivery as AC electrical power to the AC power line.

The controller can be further operative for delivering the AC electrical power to the AC power line in a manner that: reduces load induced phase shifts between the line voltage and the line current; reduces line current harmonics; and/or balances currents in AC power lines of a polyphase AC electrical distribution system.

The means for storing DC electrical power can include a capacitor. The DC electrical power source can include a battery.

The controller can be operative for controlling the operation of the converter and the inverter to deliver electrical power from the AC power line to the means for storing DC electrical power for delivery to the DC electrical power source.

The DC electrical power source can include a bank of solar cells or fuel cells, a wind turbine and/or batteries.

BRIEF DESCRIPTION OF THE DRAWINGS

FIGS. 11-14 are data of the operation of the filter F of FIG. 1 in a full reactive current correction mode (with no real power generation taking place), a full reactive current correction mode with power being delivered to the power line, full reactive current correction mode with battery charging, and harmonic current correction mode (with no real power correction taking place), respectively;

FIGS. 18A-18B are views of the $16^{th}$ through $31^{st}$ harmonics of the load $I_T$ and line $I_L$ current waveforms show in FIGS. 16A-16B;

FIGS. 19A and 19B are data regarding RMS Current, Peak Current, DC Amps, Total Harmonic Distortion and Crest Factor, respectively, of the load $I_T$ and line $I_L$ for one of the power lines of FIG. 1;

FIGS. 20A and 20B are data regarding Power in Kilowatts (KW), Power in Kilovolt-Amps (KVA), Power Factor (PF), Displacement Power Factor (DPF), and Kilovolt-Amps Reactive (KVAR), respectively, of the load $I_T$ and line $I_L$ for one of the power lines of FIG. 1;

DESCRIPTION OF THE PREFERRED EMBODIMENTS

The present invention will be described with reference to the accompanying figures where like reference numbers correspond to like elements.

An alternative to increasing the size of the components of an electrical distribution circuit is to add one or more distributed generation units throughout the electrical distribution circuit. To this end, relatively small distributed generation units can be located close to significant loads. Each such distributed generation system can provide reactive power compensation (60 Hz reactive current and harmonic current cancellation) by injecting power into or drawing power from the distribution circuit as needed. Being close to the load, the real and reactive power being supplied or withdrawn by each such distributed generation system only has to travel over a small portion of the distribution circuit to reach the load. This alleviates some of the load on the rest of the distribution circuit.

Figure 1:
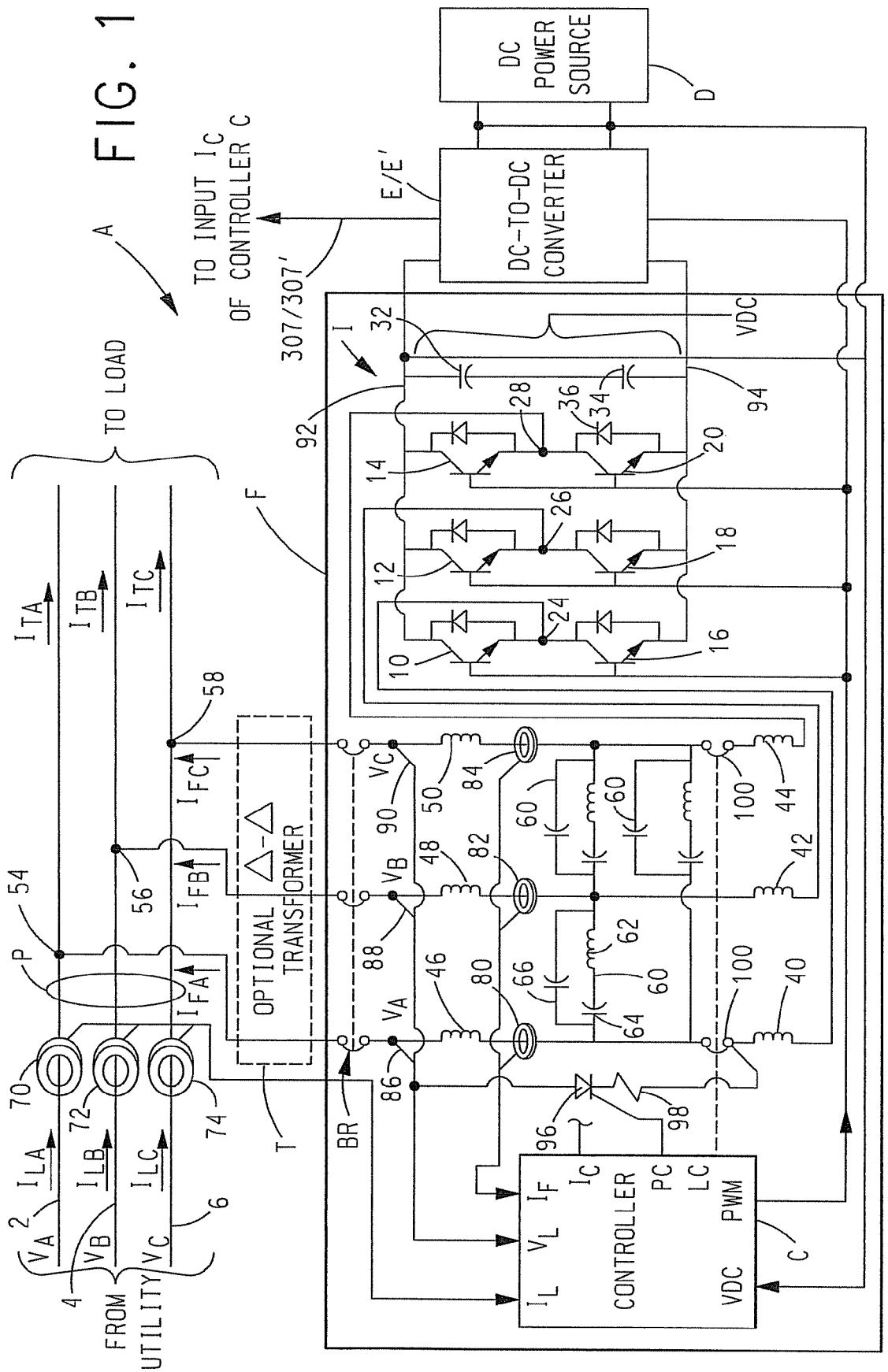
FIG. 1 is a circuit diagram of a first embodiment distributed generation system connected to a 3-phase power line.

With reference to FIG. 1, a distributed generation system A in accordance with an embodiment of the invention includes an active harmonic filter F (also called a digital power manager or DPM), comprising an inverter I and a controller C, a unregulated DC power source D and a DC-to-DC converter E which converts the unregulated DC power from DC power source D into regulated DC power, or vise versa in a manner described hereinafter.

In one embodiment, an output of active harmonic filter F is coupled directly to a power line P. Optionally, however, distributed generation system A can include an optional transformer T (shown in phantom) coupled between the output of active harmonic filter F and power line P. Optional transformer T can be utilized for isolating filter F from power line P when required. When provided, transformer T is operative for isolating the (typically) lower voltage(s) output of active harmonic filter F, operating, for example, at 480 VAC, from the higher voltage(s) impressed on power line P, operating, for example, at 12.7K VAC, and vise versa. However, there voltages are not to be construed as limiting the invention.

Active harmonic filter F is described in detail in U.S. Pat. No. 5,977,660, the contents of which are incorporated herein by reference. The operation of active harmonic filter F connected directly to power line P will now be described in detail apart from DC power source D and a DC-to-DC converter E. The following description of active harmonic filter F is disclosed in U.S. Pat. No. 5,977,660 and is reproduced next, in substantially the same form, for the purpose of completeness.

Active harmonic filter F is connected to power line P which is utilized to convey AC power from a 3-phase source (e.g., an electrical utility supplier) to a load. The power line P includes three lines 2, 4 and 6 that are utilized to convey the voltages $V_{AB}$, $V_{BC}$ and $V_{CA}$ and the line currents $I_{LA}$, $I_{LB}$, and $I_{LC}$ of phases A, B and C, respectively, of the source to the load. The source of AC power may be Delta or Y connected. If Y connected, a neutral (shown in FIG. 9) may also be provided between the source and the load.

The active harmonic filter F includes a controller C that controls an inverter I to selectively source current to or draw current from the lines 2, 4 and 6 to reduce load induced phase differences between the voltages $V_{AB}$, $V_{BC}$ and $V_{CA}$ and the currents $I_{LA}$, $I_{LB}$, and $I_{LC}$, respectively, reduce line current harmonics and balance the currents in lines 2, 4 and 6.

The inverter I includes a plurality of transistors 10-20, such as IGBTs, that are utilized to selectively source current to or draw current from the lines 2, 4 and 6. The emitter terminals of transistors 10, 12 and 14 are connected to the collector terminals of transistors 16, 18 and 20 and form nodes 24, 26 and 28, respectively. A pair of series connected capacitors 32-34 are connected in parallel with the series connected transistors 10-16, 12-18 and 14-20. Connected between the emitter terminal and the collector terminal of each transistor 10-20 is a diode 36. Each diode 36 has its anode connected to the emitter terminal and its cathode connected to the collector terminal of corresponding transistors 10-20.

Connected between nodes 24, 26 and 28 and the lines 2, 4 and 6 are power inductors 40, 42 and 44 and high frequency block inductors 46, 48 and 50, respectively. The junction of the high frequency block inductors 46, 48 and 50 and lines 2, 4 and 6 form nodes 54, 56 and 58, respectively. Connected between lines 2-4, 4-6 and 6-2 are high frequency traps/bypasses 60. Each high frequency trap/bypass 60 includes an inductor 62 and a capacitor 64 connected in series and having a resonant frequency, preferably, at or near a switching frequency of the inverter I. A capacitor 66 is connected in parallel with the series connected inductor 62 and capacitor 64. The capacitor 66 is utilized to pass between lines 2, 4 and 6 frequencies above the resonant frequency of the series connected inductor 62 and capacitor 64.

Line current sensors 70, 72 and 74 are positioned to detect the line currents $I_{LA}$, $I_{LB}$, and $I_{LC}$ in lines 2, 4 and 6, respectively, and to provide outputs corresponding thereto to the controller C. Preferably, the line current sensors 70, 72 and 74 are Hall-effect type sensors or current transformers. Filter current sensors 80, 82 and 84 are positioned to detect the filter currents $I_{FA}$, $I_{FB}$ and $I_{FC}$ flowing in the block inductors 46, 48 and 50, respectively, and to provide outputs corresponding thereto to the controller C. Preferably, the filter current sensors 80, 82 and 84 are Hall-effect type sensors.

Conductors 86, 88 and 90 are connected between the controller C and lines 2, 4 and 6, respectively, to enable the controller C to selectively detect the voltages $V_{AB}$ and $V_{BC}$ across lines 2-4 and 4-6. Conductors 92 and 94 are connected across the capacitors 32-34 and to the controller C to enable a voltage VDC impressed on the capacitors 32-34 to be detected by the controller C. The transistors 10-20 have base terminals that are connected to the controller C which supplies pulse-width-modulated (PWM) firing signals thereto.

The controller C includes a pre-charge PC output that is connected to a gate terminal of an SCR 96 or other suitable half-phase switching device. Connected in series with the SCR 96 is a resistor 98. The SCR 96 has its anode terminal connected to one of the lines, e.g., line 2. The side of the resistor 98 opposite SCR 96 is connected to the side of power inductor 40 opposite node 24. The controller C has a line contactor output LC that is utilized to control the operation of a line contactor 100 that controllably isolates the inductors 40 and 44 from lines 2 and 6, respectively, during pre-charging of the capacitors 32-34. A breaker BR is utilized to connect the inductors 46, 48 and 50 to the lines 2, 4 and 6.

To pre-charge the capacitors 32-34, the line contactor 100 is opened and breaker BR is closed. The controller provides firing signals on its PC output that cause the SCR 96 to turn-on for progressively longer half-phase intervals. For each on-time of the SCR 96, line 2 is connected to the side of inductor 40 opposite node 24 thereby enabling current to flow from line 2 through SCR 96 and resistor 98 and through inductor 40 to node 24. From node 24, the current flows through diode 36 of transistor 10, through capacitors 32-34 and through diode 36 of transistor 18 to node 26. From node 26 the current flows through inductors 42 and 48 to line 4. The inductors 40 and 42 and resistor 98 avoid excessive inrush current when the capacitors 32-34 are first connected between lines 2 and 4. When the capacitors 32-34 are charged to a sufficient level, the controller C terminates the firing signals and outputs on the line contactor output LC a signal that causes line contactor 100 to close and connect inductors 40 and 44 to lines 2 and 6, respectively. The controller C provides modulated PWM firing signals that enable transistors 10-20 and power inductors 40, 42 and 44 to co-act and charge capacitors 32-34 to a voltage VDC, preferably, about 15% above the peak voltage appearing across lines 2-4, 4-6 and 6-2. For example, for a 480 VAC voltage measured across lines 2-4, the capacitors 32-34 are charged to approximately 780 volts DC.

Figure 2:
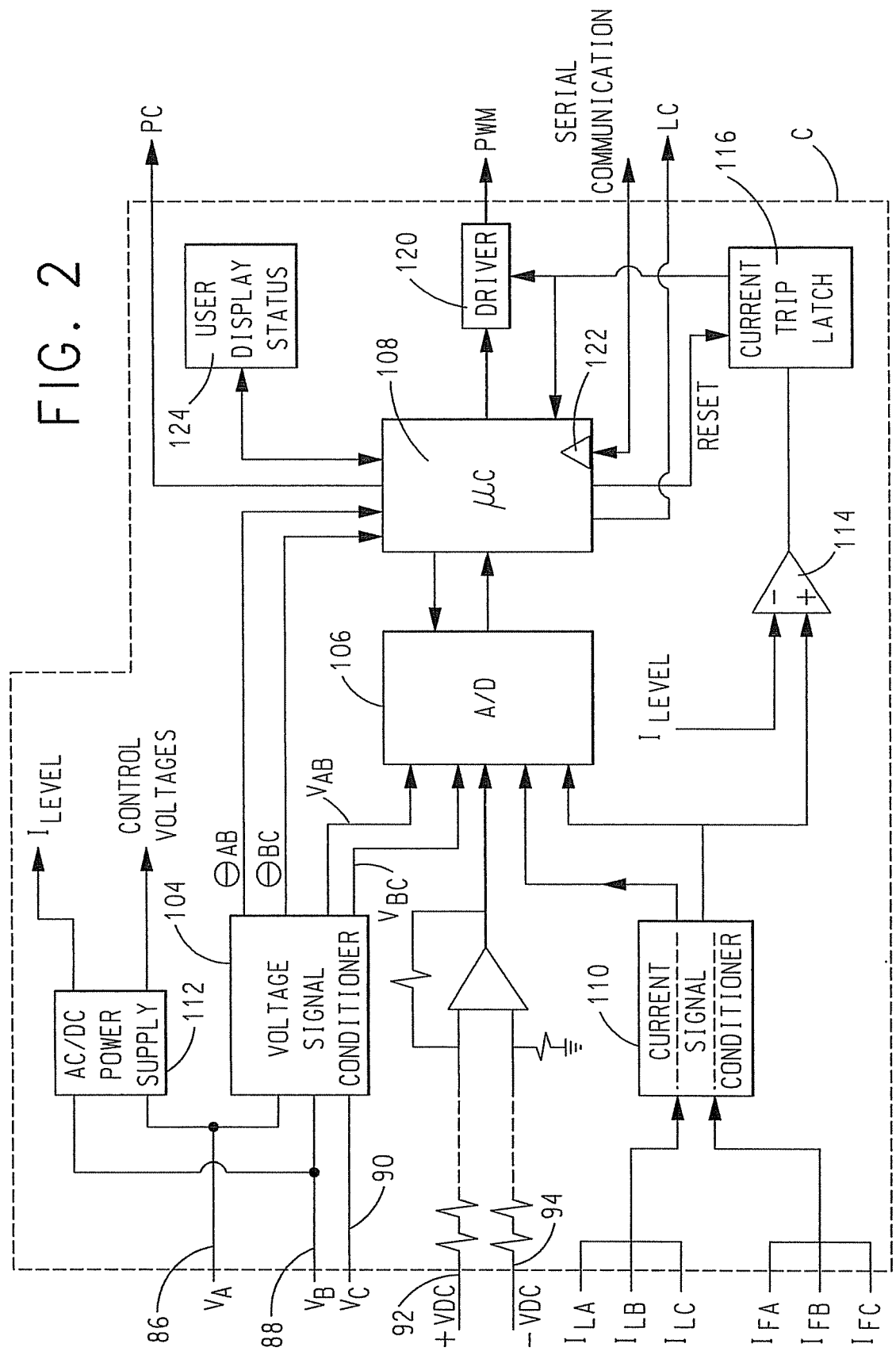
FIG. 2 is a block diagram of the internal components of the controller C of the distributed generation system of FIG. 1.

With reference to FIG. 2 and with continuing reference to FIG. 1, the controller C includes a voltage signal conditioner 104 which is connected to lines 2, 4 and 6 via the conductors 86, 88 and 90. The voltage signal conditioner 104 conditions and provides to an A/D converter 106 voltages $V_{AB}$ and $V_{BC}$ and provides to a microcontroller 108 phases $\theta_{AB}$ and $\theta_{BC}$. The microcontroller 108 includes support circuitry (not shown), such as a memory unit that includes RAM and ROM, I/O drivers, timers and the like. The voltages $V_{AB}$ and $V_{BC}$ are converted by the A/D converter 106 to corresponding digital values which are provided to the microcontroller 108. The microcontroller 108 provides synchronization and control signals to the A/D converter 106 to control the operation thereof. A current signal conditioner 110 receives the output of line current sensors 70, 72 and 74 and filter current sensors 80, 82 and 84. The signal conditioner 110 conditions the received signals and provides conditioned signals indicative of the line currents $I_{LA}$, $I_{LB}$, and $I_{LC}$ and the filter currents $I_{FA}$, $I_{FB}$ and $I_{FC}$ to the A/D converter 106 which converts the conditioned signals into digital values which are provided to the microcontroller 108.

An AC/DC power supply 112 is connected across two of the lines, e.g., 2-4 and, converts AC power therefrom into DC control voltages utilized by internal circuitry of the controller C. The power supply 112 also provides a reference voltage signal $I_{LEVEL}$ to an inverting input of a comparator 114 that has its non-inverting input connected to detect a conditioned signal corresponding to the output of one of the filter currents sensors 80, 82 and 84. The output of the comparator 114 is provided to a current trip latch 116. When a current detected by one or more of filter current sensor 80, 82 and 84 produces a voltage that exceeds the reference voltage signal $I_{LEVEL}$, the output of the comparator 114 changes in state. In response to this change in state, the current trip latch 116 provides a signal to the microcontroller 108 and driver 120 which causes the PWM firing signals provided to the transistors 10-20 to be terminated. The termination of PWM firing signals to the transistors 10-20 causes the filter F to terminate sourcing current to or drawing current from lines 2, 4 and 6.

A line driver 120 is connected to receive from the microcontroller 108 data corresponding to desired duty cycle 5 of the PWM firing signals provided to the transistors 10-20. The driver 120 converts the supplied data into the desired PWM firing signals, having the desired duty cycles, provided to the base terminals of transistors 10-20. The microcontroller 108 causes the transistors 10-20 to be modulated at a frequency of approximately 10 KHz which, for a supply line frequency of 60 Hz, results in 168 PWM periods per cycle of the lines 2, 4 and 6.

The microcontroller 108 has a bi-directional serial communications port 122 for bi-directional communication with devices external to the controller C, such as a remote computer. A user display status 124 is provided to indicate the operational status of the filter F.

Figure 3:
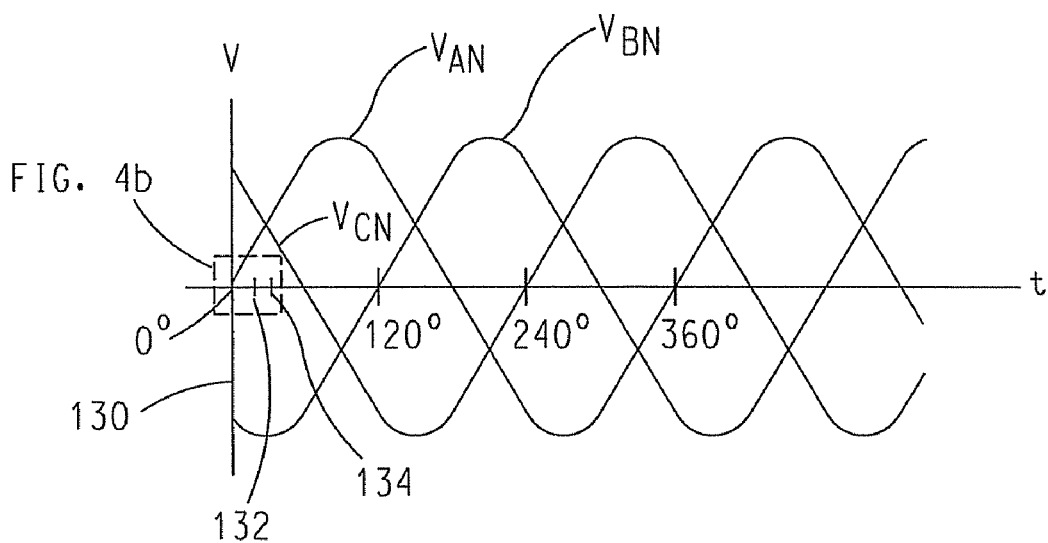
FIG. 3 is a voltage waveform of the voltages appearing on the 3-phase power lines of FIG. 1 referenced to a neutral.

With reference to FIG. 3, the 3-phase source produces across the lines 2-4, 4-6 and 6-2, the voltages $V_{AB}$, $V_{BC}$ and $V_{AC}$ that are electrically shifted in phase with respect to each other by 120 electrical degrees in a manner known in the art. In conventional 3-phase power systems, the amplitude and phase of phase-to-phase voltages $V_{AB}$, $V_{BC}$ and $V_{CA}$ can be numerically converted to phase-to-neutral voltages $V_{AN}$, $V_{BN}$ and $V_{CN}$, as shown in FIG. 3.

The 3-phase source ideally supplies voltages and currents to a purely resistive load, i.e., a load with no reactive components, to introduce phase shifts between the line voltage and the line current. To correct for phase differences between line voltages and line currents, harmonic currents or phase current imbalance, the active harmonic filter F sources current to or draws current from the lines 2, 4 and 6 at a plurality of suitable times during each cycle of the line voltage.

Figure 4A:
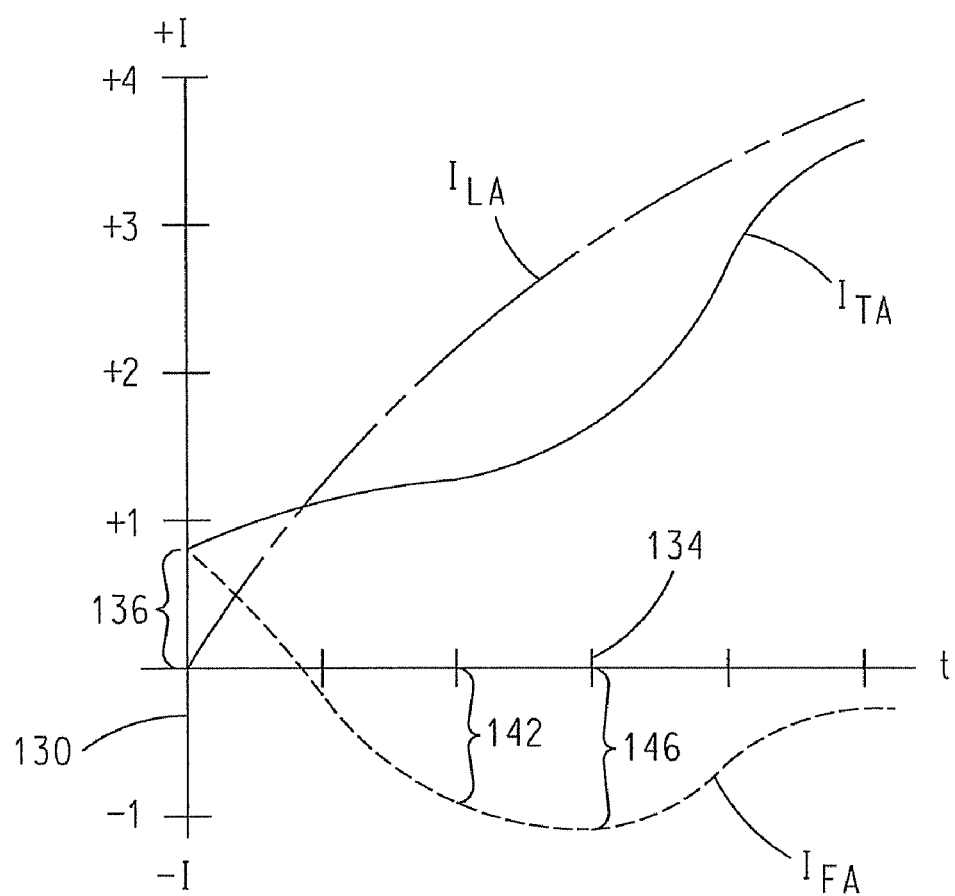
FIGS. 4a-4b are current and voltage waveforms of a portion of the voltage waveform in FIG. 3 including current and voltage waveforms produced by the filter F of the distributed generation system of FIG. 1.
Figure 4B:
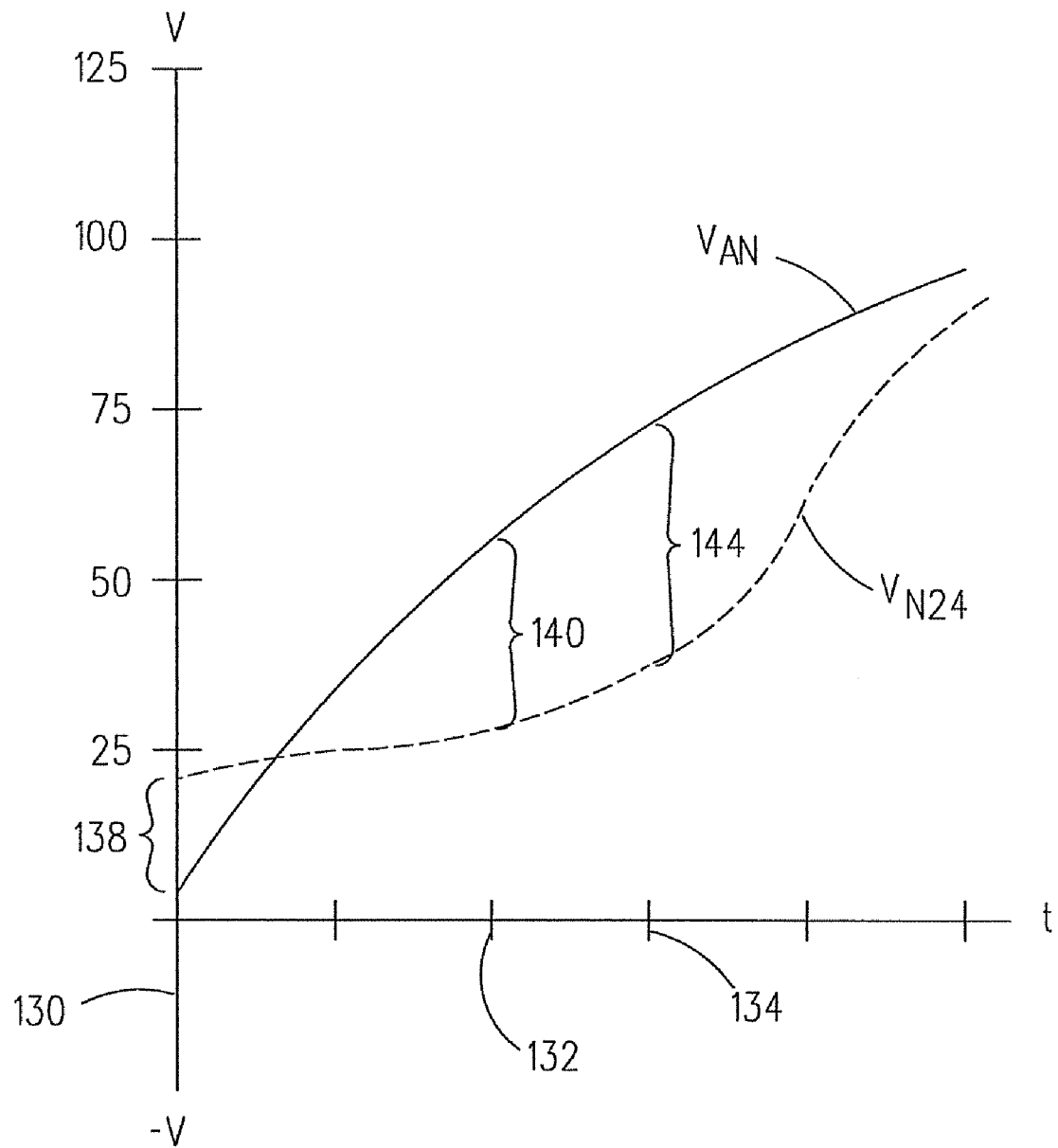

With reference to FIGS. 4a and 4b and with continuing reference to FIG. 1, when the filter F is not sourcing or drawing current, the microcontroller 108 adjusts the duty cycle of the PWM firing signals provided to transistors 10-20 during each PWM period so that the voltages at nodes 24, 26 and 28 track the line voltages at nodes 54, 56 and 58, respectively. For example, as the voltage $V_{AN}$ increases between a time 130 and a time 134, the duty cycle of the PWM firing signals supplied to the base terminal of transistors 10, 18 and 20 are increased and the duty cycle of the PWM firing signals supplied to the base terminals of transistors 16, 12 and 14 are decreased. Importantly, the duty cycle of any pair of series connected transistors, e.g., 10 and 16, are selected so that both of the series transistors are not on simultaneously.

When the filter F sources or draws current, the PWM firing signals provided to the transistors 10-20 are selectively modulated. For example, to source current 136 to line 2 at time 130, the duty cycle of the PWM firing signals provided to the base terminals of transistors 12, 14 and 16 are decreased and the duty cycle of the PWM firing signals provided to the base terminals of transistors 10, 18 and 20 are increased. These PWM firing signals alternately connect node 24 to the +VDC side and −VDC side of capacitors 32-34 and connect nodes 26 and 28 to the −VDC side and +VDC side of capacitors 32-34, respectively. More specifically, when transistors 12, 14 and 16 are on, a circuit path is created between nodes 54 and 24, through transistor 16 to the −VDC side of capacitors 32-34, through transistors 12 and 14 to nodes 26 and 28 and to nodes 56 and 58. Similarly, when transistors 10, 18 and 20 are on, a circuit path is created between nodes 24 and 54, through transistor 10 to the +VDC side of capacitors 32-34, through transistors 18 and 20 to nodes 26 and 28 and to nodes 56 and 58. The duty cycle of the PWM firing signals to transistors 10-20 are selected so that the voltage drop between nodes 24 and 54 results in the current 136, e.g., 0.8 amps, being supplied to the line 2 at time 130.

The microcontroller 108 determines the voltage drop $V_L$ across inductors 40 and 46 and the impedance of the inverter necessary to draw the current 136 from the conductor 2 at time 130 utilizing the formula:

$$VL=(I_{FA})(R)+(L)(dI_{FA}/dt)$$

where $I_{FA}$=the current through inductors 40 and 46;

R=resistance of inductors 40 and 46 and of the inverter; and

L=inductance of inductors 40 and 46.

To determine the voltage 138 required at node 24 at time 130 to cause current 136 to flow through inductors 40, 46, the microcontroller 108 samples the voltages $V_{AB}$, $V_{BC}$ and phases $\theta_{AB}$, $\theta_{BC}$; determines an equivalent phase-to-neutral voltage $V_{AN}$; and adds the phase-to-neutral voltage $V_{AN}$ and the voltage $V_L$.

The microcontroller 108 calculates the appropriate duty cycle of the PWM firing signals provided to transistors 10-20 to produce at node 24 the voltage 138 that draws the current 136 from line 2. Similarly, at time 132 the microcontroller 108 causes a voltage 140 to be produced at node 24 that causes a current 142 to be drawn from line 2. Likewise, at time 134 the microcontroller 108 causes a voltage 144 to be produced at node 24 that causes a current 146 to be drawn from line 2.

The microcontroller 108 includes a software routine resident in a memory unit. The software routine causes the microcontroller 108 to sample at a plurality of times during each line cycle the line-to-line voltages $V_{AB}$ and $V_{BC}$, the line currents $I_{LA}$, $I_{LB}$, and $I_{LC}$, the voltage VDC across capacitors 32-34, and filter currents $I_{FA}$, $I_{FB}$ and $I_{FC}$. The software routine includes a control algorithm that determines the data to be supplied to the driver 120 that causes the duty cycle of the PWM firing signals provided to transistors 10-20 to be modulated at appropriate times to cause the desired filter currents $I_{FA}$, $I_{FB}$ and $I_{FC}$ to be supplied to or drawn from lines 2, 4 and 6.

With reference to FIGS. 5a-5d and with continuing reference to FIGS. 1 and 2, the control algorithm generates variables for each calculation of data provided to the driver 120. The control algorithm will be described in respect of the calculation of data for correction of phase shift and line harmonics for the A phase, i.e., line 2, of the 3-phase source. However, similar calculations are performed to correct for phase shifts and line harmonics in the B phase, i.e., line 4 of the 3-phase source. For purposes of describing the control algorithm, the following listing of variables and a brief description of each variable is provided:

$K1_A$ value corresponding to magnitude of RMS line current to be drawn from phase A to satisfy the load requirement;

K2 value corresponding to RMS line current to maintain VDC at desired level $K3_A$ RMS line current $I_{LA}$ to satisfy load requirement and to maintain VDC at desired level;

K4 empirically determined value that is directly proportional to the period of utility voltage and inversely proportional to VDC, to correct for variations in these two parameters;

$K5_A$, $K5_B$, $K5_C$ values corresponding to PWM modulation that causes the voltage output by the filter F to track the line voltage;

$K6_A$ value corresponding to instantaneous desired line current $I_{LA}$ to provide all power to load;

$K7_A$ value corresponding to difference current between instantaneous actual line current $I_{LA}^{INST}$ and instantaneous desired line current $K6_A$;

$K8_A$ value corresponding to voltage needed to reduce line harmonics and balance line currents ILA, ILB, and ILC;

$K9_A$ value corresponding to instantaneous actual load current $I_{TA}$;

$K10_A$ value corresponding to instantaneous filter current $I_{FA}$ to be supplied to line current $I_{LA}$ to achieve the instantaneous desired line current $I_{LA}$, i.e., $K6_A$;

$K11_A$ value corresponding to filter current $I_{FA}$ combined at time t with value $K10_A$ to obtain an adjustment value $A_p$ corresponding to current $I_{FA}$ to be supplied at time t+Δt;

$K12_A$ value corresponding to voltage needed to reduce line harmonics and balance line currents $I_{LA}$, $I_{LB}$, and $I_{LC}$;

$K13_A$ value corresponding to voltage needed at time t+Δt to produce filter current $I_{FA}$ that reduces the phase difference between the load current $I_{LA}$ and the line voltage $V_{AN}$, reduces line harmonics and balances line currents;

$K14_A$, $K14_B$, $K14_C$ values corresponding to value $K13_A$ limited to avoid software current limit $I_{LIMIT}$, e.g., 250% of rated RMS maximum filter current $I_{FA}$;

$K15_A$, $K15_B$, $K15_C$ values corresponding to difference between $K13_A$ and $I_F^{LIMIT}$;

$K16_A$, $K16_B$ $K16_C$ value of modulation needed to reduce phase shifts between line voltages $V_{AN}$, $V_{BN}$ and $V_{CN}$ and line currents $I_{LA}$, $I_{LB}$, and $I_{LC}$ and line voltage harmonics and to improve the balance of the load currents ILA, ILB, and ILC;

$K17_A$, $K17_B$, $K17_C$ values corresponding to modulation to be applied to the leading and falling edges of PWM waveforms; and $V_1$, $V_2$, $V_3$ data values of $K17_A$, $K17_B$ and $K17_C$ normalized, clamped and scaled;

Similarly, values $K1_B$, $K3_B$, $K7_B$, $K8_B$, $K9_B$, $K10_B$, $K11_B$, $K12_B$, $K13_B$ exist for phase B.

The control algorithm causes the microcontroller 108 to measure at a plurality of times during each line cycle the instantaneous line-to-line voltages $V_{AB}^{INST}$ and $V_{BC}^{INST}$. The value $V_{CA}^{INST}$ for each of the plurality of times is determined from the samples of $V_{AB}^{INST}$ and $V_{BC}^{INST}$. The microcontroller 108 also measures the instantaneous line currents $I_{LA}^{INST}$, $I_{LB}^{INST}$ and $I_{LC}^{INST}$ and the instantaneous filter currents $I_{FA}^{INST}$, $I_{FB}^{INST}$ and $I_{FC}^{INST}$. From the plurality of measured instantaneous line and filter currents, corresponding instantaneous load currents $I_{TA}^{INST}$, $I_{TB}^{INST}$ and $I_{TC}^{INST}$ are determined. RMS line-to-neutral voltages $V_{AN}^{RMS}$, $V_{BN}^{RMS}$ and $V_{CN}^{RMS}$ and RMS line currents $I_{LA}^{RMS}$, $I_{LB}^{RMS}$ and $I_{LC}^{RMS}$ can be calculated for a desired interval, e.g., one line cycle, from the instantaneous line-to-neutral voltages, line currents and filter currents.

Figure 5A:
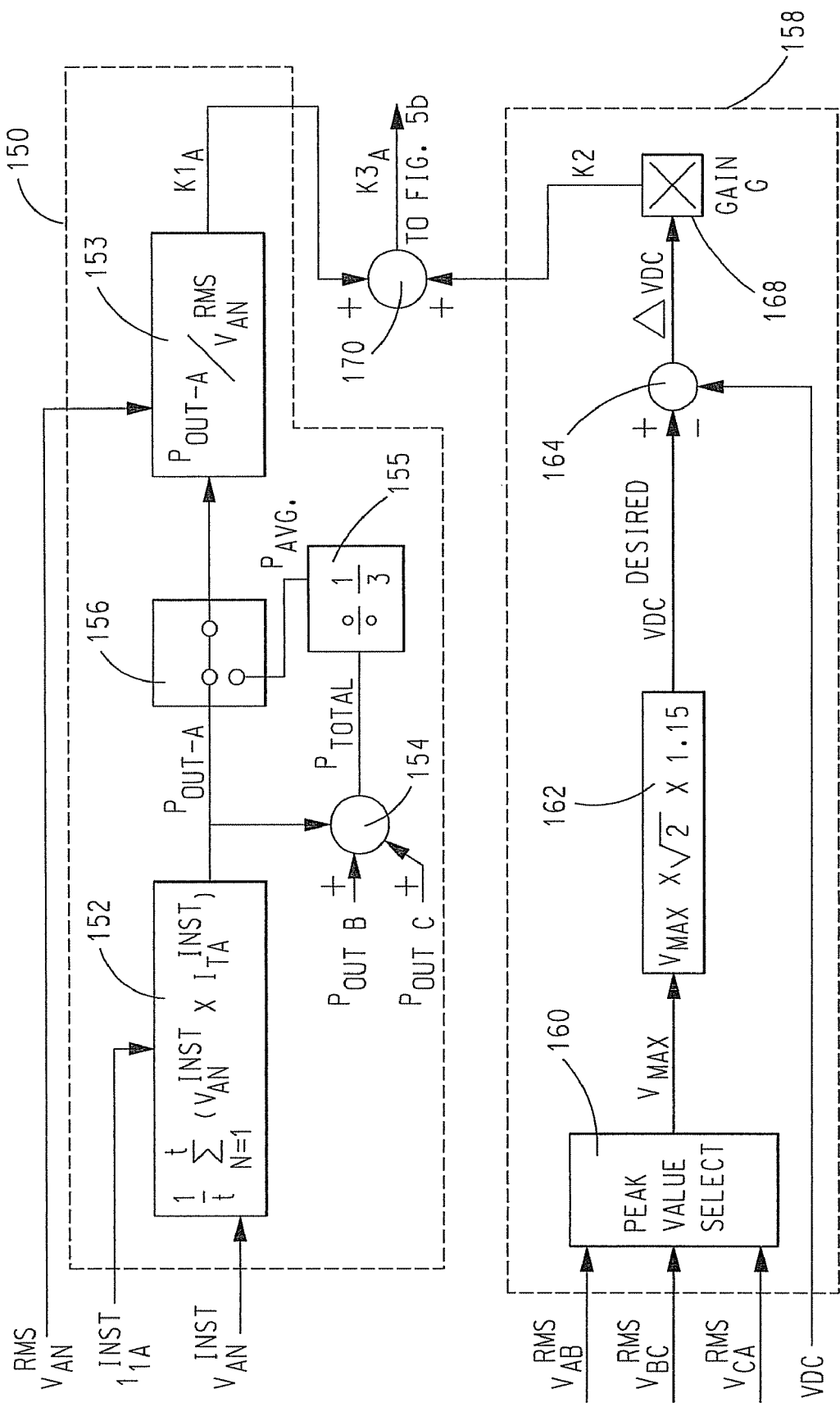
FIGS. 5a-5d is a software flow diagram of a control routine implemented by the controller C in FIG. 1.

With reference to FIG. 5a, the control algorithm includes a routine 150 which includes a step 152 where the power supplied to the load over an interval of time t is determined from the plural samples of the instantaneous line voltage $V_{AN}^{INST}$ and corresponding instantaneous line current $I_{TA}^{INST}$. Step 152 produces a value $P_{OUT-A}$ corresponding to the power delivered to the load from the calculated phase-to-neutral circuit, e.g., $V_{AN}$, during a time t. In a step 153, the value $P_{OUT-A}$ is divided by the calculated value of the RMS line-to-neutral voltage $V_{AN}^{RMS}$ to obtain the value $K1_A$ corresponding to the magnitude of the RMS line current $I_L^{RMS}$ to satisfy the requirement of the load. If it is desired to balance the currents in the lines 2, 4 and 6, a step 154 combines the values $P_{OUT-A}$, $P_{OUT-B}$ and $P_{OUT-C}$ and outputs a value $P_{TOTAL}$ corresponding to the total power delivered to the load from the calculated phase-to-neutral circuits $V_{AN}$, $V_{BN}$ and $V_{CN}$. The values $P_{OUT-B}$ and $P_{OUT-C}$ are determined in a manner similar to $P_{OUT-A}$. In step 155, the value $P_{TOTAL}$ is divided by 3 to produce an average power value $P_{AVG}$. The average power value $P_{AVG}$ is provided to a software switch 156 which selectively directs the value of $P_{OUT-A}$ or $P_{AVG}$ to step 153 for the calculation of the value $K1_A$. The value $P_{AVG}$ is also utilized to determine values of $K1_B$ for the B phase.

The control algorithm includes a routine 158 which includes a step 160 where the peak value of the RMS line-to-line voltages $V_{AB}^{RMS}$, $V_{BC}^{RMS}$ and $V_{CA}^{RMS}$ is detected and provided as an output $V_{MAX}$ to step 162. Step 162 calculates the value $VDC^{DESIRED}$ corresponding to the desired VDC voltage across capacitors 32-34 that is a selected amount, e.g., 15%, in excess of the peak voltage detected in step 160. In step 164, the value of $VDC^{DESIRED}$ and the measured value VDC are combined to obtain a difference value ΔVDC. In step 168, the difference value of ΔVDC is combined with a proportional control gain function G to obtain the value K2 which corresponds to the RMS current needed to maintain VDC at the desired level. In step 170, the values $K1_A$ and K2 are combined to produce a value $K3_A$ corresponding to the line current $I_{LA}$ needed to satisfy the phase A load requirement and to maintain VDC at the desired level. Steps corresponding to steps 160-170 are performed to obtain values for K3$_B$ for the B phase.

Figure 5B:
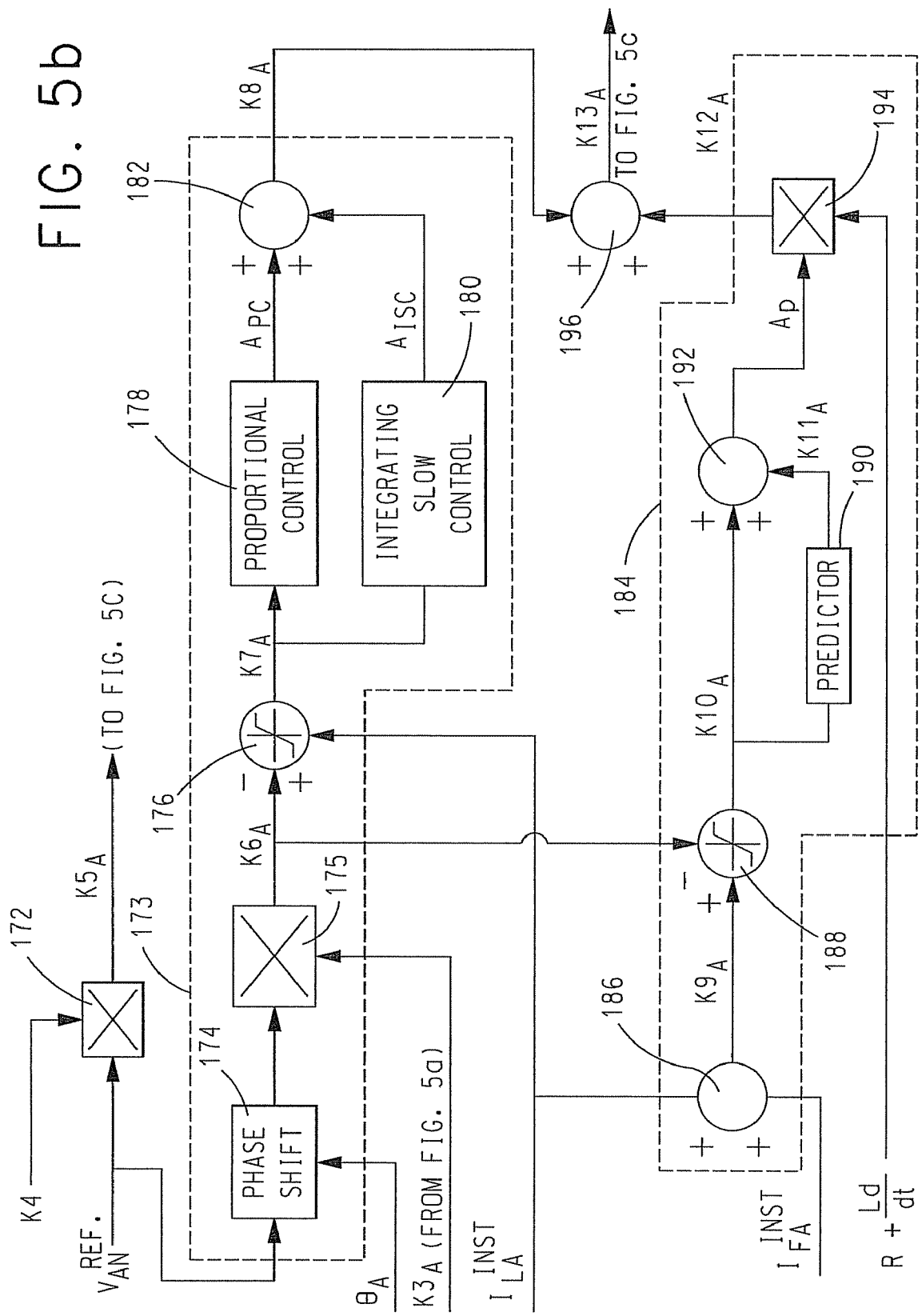

Referring to FIG. 5b, the microcontroller 108 determines a line-to-neutral reference voltage V$_{AN}^{REF}$ from the calculated value of RMS line-to-neutral voltage V$_{AN}^{RMS}$ and the calculated phase θ$_{AN}$. The line-to-neutral reference voltage V$_{AN}^{REF}$ is a calculated sine wave that is directly in phase with V$_{AN}^{RMS}$. In step 172, the line-to-neutral reference voltage V$_{AN}^{REF}$ is combined with a value K4 which is directly proportional to the period of the utility voltage and inversely proportional to the voltage VDC across capacitors 32-34. More specifically, the value K4 is calculated as follows:

$$K4 = \frac{(\text{Period AC source})(\text{VDC\_Nominal})}{(\text{VDC})(\text{Period\_Nominal})}$$

Step 172 outputs a value K5$_A$ which corresponds to a phase A PWM modulation that is combined with a nominal phase A PWM modulation to produce at node 24 a voltage that tracks the voltage on line 2.

The line-to-neutral reference voltage V$_{AN}^{REF}$ is also provided to a routine 173 which includes a step 174 where the line-to-neutral reference voltage V$_{AN}^{REF}$ is combined with a software generated phase θA. The phase θA is normally zero degrees. However, as the filter F approaches its maximum current capability, the value of phase θA can be increased up to the calculated phase shift between the line-to-neutral voltage V$_{AN}$ and the load current I$_{TA}$. As will be discussed in greater detail hereinafter, this results in the filter F utilizing its full capacity to reduce harmonics at the expense of less correction of phase differences between line-to-neutral voltages and line currents.

The value of K3$_A$ from step 170 is provided to step 175 of routine 173. Step 175 combines the value K3$_A$ with the output of step 174 to obtain a value K6$_A$ corresponding to the instantaneous desired line current I$_{LA}$ required to provide all of the power to the load. In step 176, the value K6$_A$ is combined with the instantaneous line current I$_{LA}^{INST}$ and the combination is limited to produce a value K7$_A$ corresponding to the difference current between the instantaneous line current I$_{LA}^{INST}$ and K6$_A$. The value K7$_A$ is provided to a proportional control routine 178 and an integrating slow control routine 180.

The proportional control routine 178 combines the value K7$_A$ with a known proportional control algorithm to produce an adjustment value A$_{PC}$. The integrating slow control 180, to be described in greater detail hereinafter, produces an adjustment value A$_{ISC}$ in response to the input of the value K7$_A$ thereto. In step 182, the values of A$_{PC}$ and A$_{ISC}$ are combined to produce the value K8$_A$ which is utilized to reduce harmonics of the line current, correct phase shifts and balance the line currents.

A control routine 184 is utilized to determine the filter current I$_{FA}$ to be supplied to or drawn from the line current I$_{LA}$ at a time t+Δt. The control routine 184 includes a step 186 where the instantaneous line current I$_{LA}^{INST}$ is combined with the instantaneous filter current I$_{FA}^{INST}$ to obtain a value K9$_A$ corresponding to the instantaneous load current I$_{TA}^{INST}$. In step 188, the values K9$_A$ and K6$_A$ are combined to produce a difference value K10$_A$ corresponding to the instantaneous filter current I$_{FA}$ to be sourced to or drawn from the line current I$_{LA}$ to reduce harmonics, phase shift, and current imbalance. Ideally, the PWM firing signal modulation that causes the filter currents I$_{FA}$, I$_{FB}$ and I$_{FC}$ to be sourced to or drawn from the lines 2, 4 and 6, are calculated and provided in real time. However, the approximately 10 KHZ switching frequency of the inverter and, the digitization of data and the foregoing calculations introduce delays that prevent real-time calculation and application of the PWM firing signal modulation. Hence, by the time corrections to the modulation of the PWM firing signals are made, it is often too late to totally correct the line currents I$_{LA}$, I$_{LB}$, and I$_{LC}$. Accordingly, it is necessary to predict how the line currents I$_{LA}$, I$_{LB}$, and I$_{LC}$ are going to react at a time t+Δt.

The control routine 184 includes a predictor routine 190, to be described in greater detail hereinafter, which produces a value K11$_A$ corresponding to the filter current to be supplied at time t+Δt. In step 192, the values K10$_A$ and K11$_A$ are combined to produce an adjustment value A$_P$ corresponding to the filter current I$_{FA}$ needed at time t+Δt. In step 194, the adjustment value A$_P$ is combined with the resistive and inductive values of the inductors, e.g., 40 and 46, and the inverter through which the filter current I$_{FA}$ flows at time t+Δt. Step 194 produces a value K12$_A$ corresponding to the voltage to be produced at node 24 to cause the filter current I$_{FA}$ to be supplied at time t+Δt. More specifically, the value K12$_A$ accounts for the voltage drop across inductors 40 and 46 and the inverter switches caused by filter current I$_{FA}$ flowing therethrough. In step 196, the values of K8$_A$ and K12$_A$ are combined to produce a value K13$_A$ corresponding to the voltage needed to provide the filter current I$_{FA}$ at time t+Δt that reduces the phase difference between the voltage on line 2 and the line current I$_{LA}$ and reduces harmonics of the current on line 2.

Figure 5C:
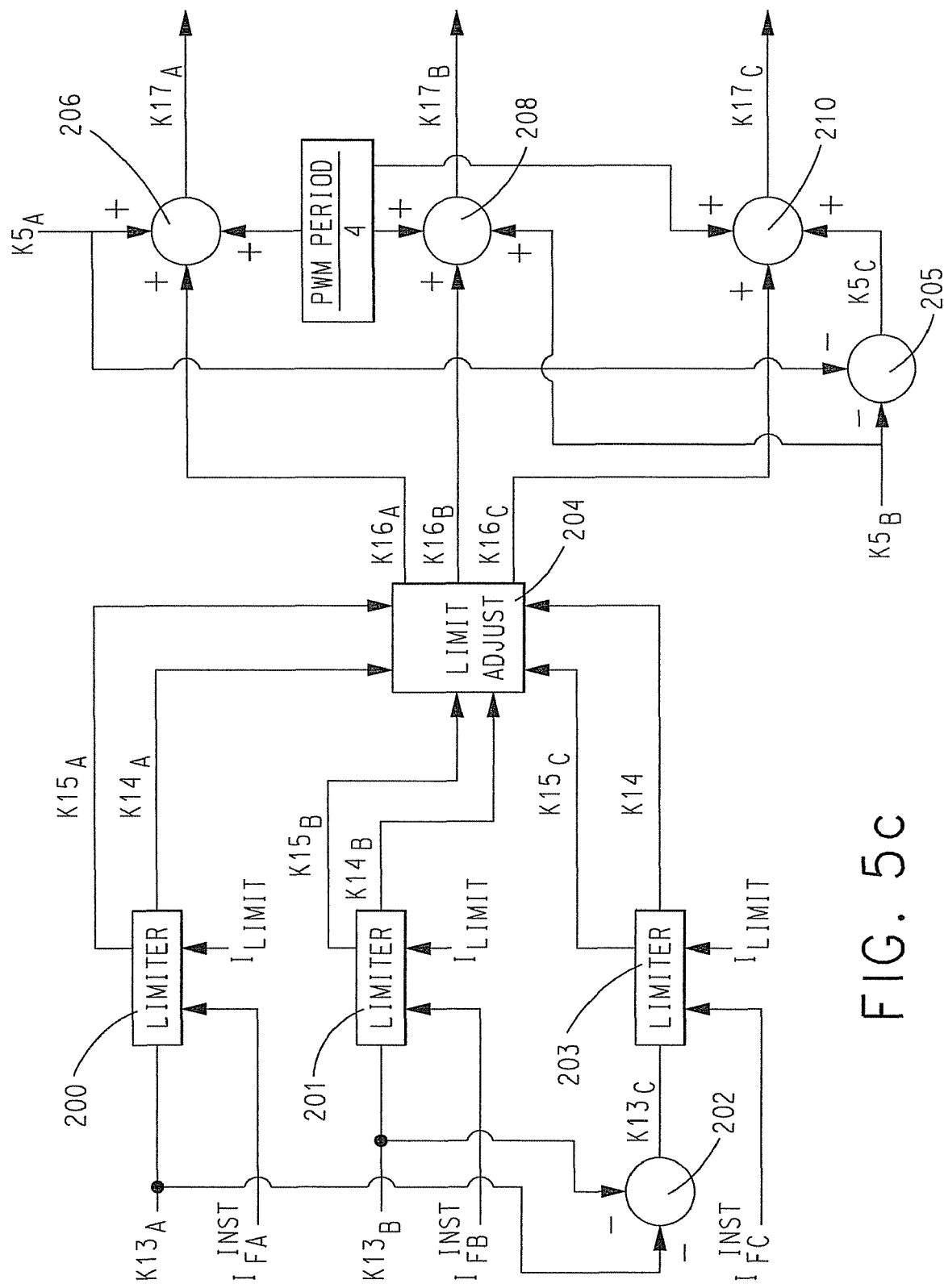

With reference to FIG. 5c, in steps 200 and 201, a current limit I$_{LIMIT}$ is combined with the instantaneous filter currents I$_{FA}^{INST}$ and I$_{FB}^{INST}$ and values K13$_A$ and K13$_B$, respectively. The value K13$_B$ is determined in a manner similar to the value K13$_A$. In a step 202, the values of K13$_A$ and K13$_B$ are combined to produce a value K13$_C$. In step 203, the software generated current limit I$_{LIMIT}$, the instantaneous filter current I$_{FC}^{INST}$ and the value K13$_C$ from step 202 are combined. The steps 200, 201 and 203 output values K14$_A$, K14$_B$ and K14$_C$ corresponding to the values of K13$_A$, K13$_B$ and K13$_C$, respectively, limited to avoid the filter limit current value I$_{LIMIT}$, which is preferably 250% of the rated RMS current of the filter F. Steps 200, 201 and 203 also generate values K15$_A$, K15$_B$ and K15$_C$ corresponding to the difference between K13$_A$ and I$_{LIMIT}$, K13$_B$ and I$_{LIMIT}$ and K13$_C$ and I$_{LIMIT}$, respectively.

In step 204, the modulation difference values K15$_A$, K15$_B$ and K15$_C$ are summed. If the sum of the difference values does not equal zero, modulation values K14$_A$, K14$_B$ and K14$_C$ are adjusted so that the difference values K15$_A$, K15$_B$ and K15$_C$ sum to zero. More specifically, when the difference values K15$_A$, K15$_B$ and K15$_C$ do not sum to zero, adjustments are made to two of the modulation values, e.g., K14$_A$ and K14$_B$, requiring the least adjustment. This adjustment includes subtracting half of the sum of the difference values from each of the two phases. The limit adjust step 204 outputs values K16$_A$, K16$_B$ and K16$_C$ corresponding to the modulation adjustment needed to reduce the phase shift between the line voltage and line current, to reduce line current harmonics and to improve the balance of load currents in the lines 2, 4 and 6 if P$_{AVG}$ is utilized to determine K1$_A$.

In step 205, the value K5$_B$, calculated in a manner similar to K5$_A$ for a line-to-neutral reference voltage V$_{BN}^{REF}$, is combined with the value K5$_A$ to produce the value K5$_C$. In steps 206, 208 and 210, 25% of the PWM period is combined with the values K5$_A$, K5$_B$, K5$_C$ and the values K16$_A$, K16$_B$, K16$_C$ to produce output values K16$_A$, K17$_B$, K17$_C$, respectively, corresponding to the modulation adjustments to be applied to the leading and falling edges of the PWM firing signals supplied to transistors 10-20. Importantly, as the filter F approaches 250% of $I_{LIMIT}$, the limiting steps 200, 201 and 203 progressively limit the values $K14_A$, $K14_B$ and $K14_C$ so that the filter F does not produce filter currents $I_{FA}$, $I_{FB}$ and $I_{FC}$ in excess of 250% of its RMS capacity. In this respect, the value $I_{LIMIT}$ supplied to limiter steps 200, 201 and 203 normally equals the rated RMS current of the filter F. However, if the actual RMS current of the filter F exceeds the rated value, the value of $I_{LIMIT}$ is reduced. This reduction results in the actual RMS current being reduced to the rated value. In this manner, filter F can produce momentary filter currents up to 250% of the rated RMS current to supply momentary peak load current demands while avoiding extended exposure to RMS currents in excess of its capacity.

Figure 5D:
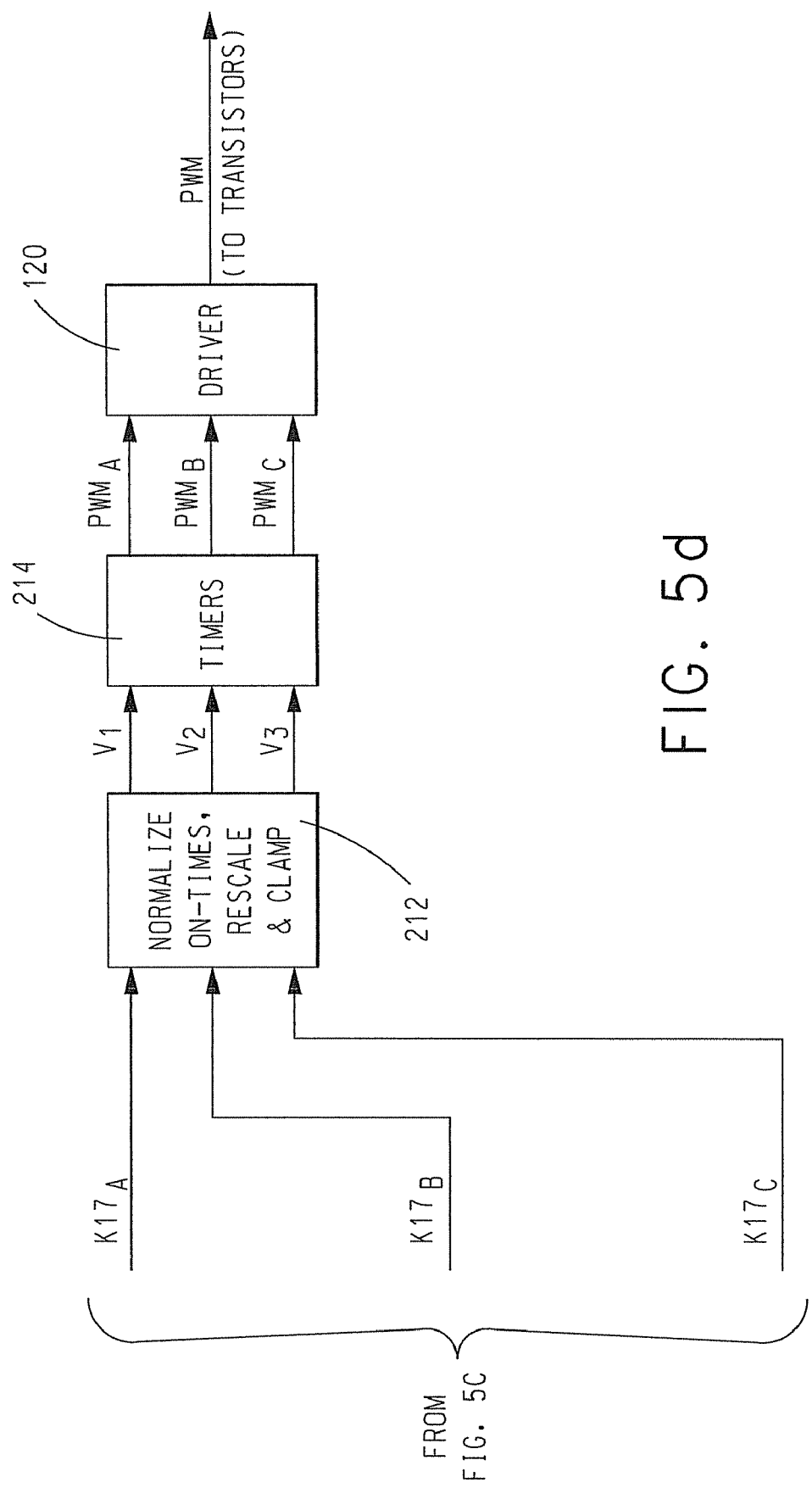

Referring to FIG. 5d, in step 212, each of the values of $K17_A$, $K17_B$ and $K17_C$ are normalized, rescaled and clamped to duty cycle times $V_1$, $V_2$ and $V_3$ which are provided to the timers 214. The timers 214 convert the duty cycle times to PWM firing waveforms $PWM_A$, $PWM_B$, and $PWM_C$. Driver 120 converts the PWM firing waveforms $PWM_A$, $PWM_B$, and $PWM_C$ to the modulated PWM firing signals provided to the transistors 10-20.

Figure 6A:
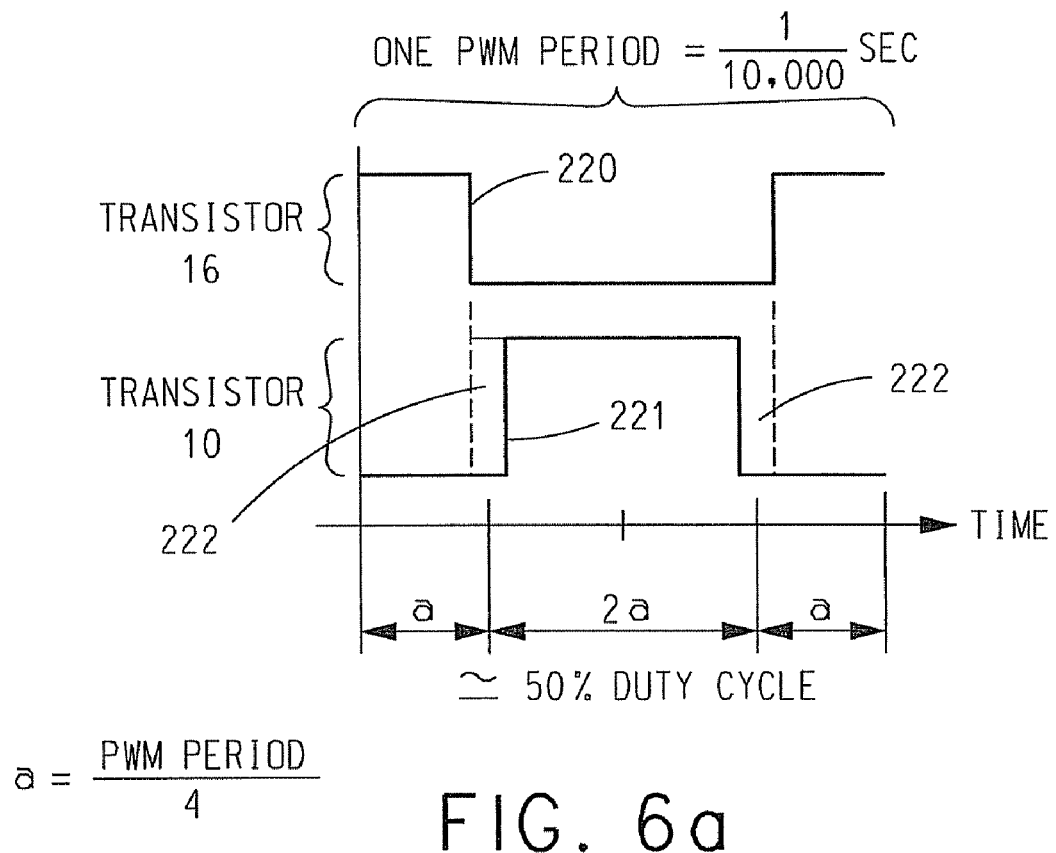
FIGS. 6a-6c are voltage waveforms of the duty cycles of transistors of the filter F of the distributed generation system of FIG. 1.
Figure 6B:
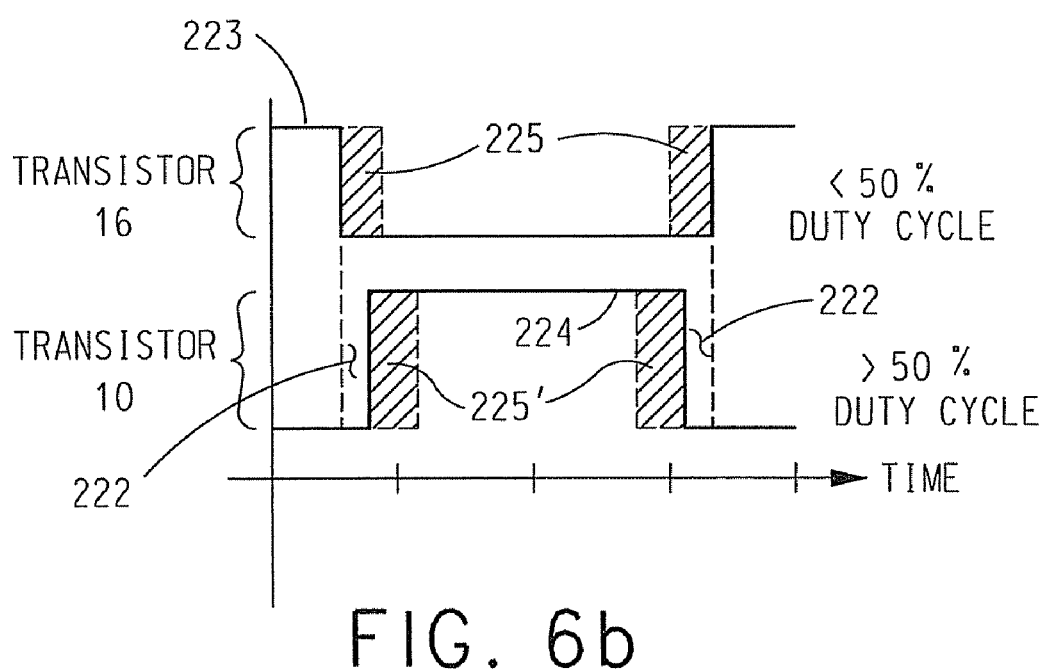
Figure 6C:
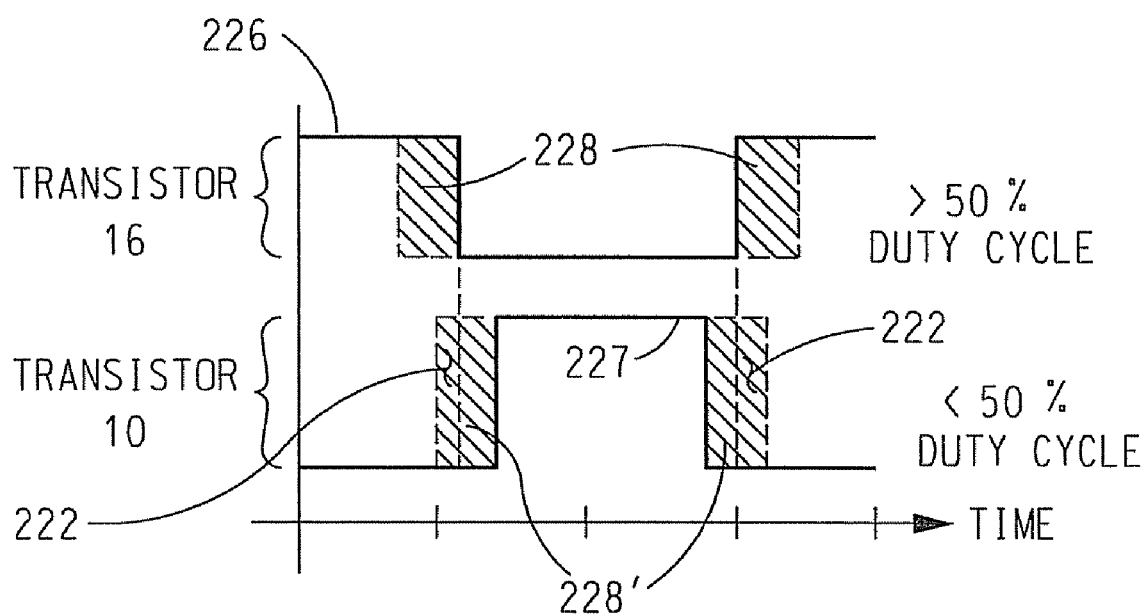

With reference to FIG. 6a, PWM firing signals 220 and 221 for transistors 16 and 10, respectively, are shown in relation to one PWM interval. The PWM firing signals 220 and 221 have a 50% duty cycle. To avoid having PWM firing signals 220 and 221 on simultaneously, a short dead time 222 is provided between the turn-off of transistor 10 and the turn-on of transistor 16 and vice versa. This dead time 222 ensures that opposite terminals of capacitors 32-34 are not shorted. The duty cycles of PWM firing signals 220 and 221 in FIG. 6a are exaggerated to emphasize the dead time 222. FIG. 6b illustrates PWM firing signal 224 having greater than a 50% duty cycle and PWM firing signal 223 having less than a 50% duty cycle. The amount added to each side of the 50% duty cycle waveform of FIG. 6a to obtain the PWM firing signal 224 is shown as shaded areas 225'. The amount removed from each of the PWM firing signal 223 is shown as shaded area 225. The added and removed amounts 225' and 225 correspond to a value for $K16_A$ and $K5_A$ in the control algorithm of FIGS. 5a-5d. FIG. 6c illustrates PWM firing signal 227 having a duty cycle less than 50% and PWM firing signal 226 having a duty cycle greater than 50%. The amount removed from each side of the 50% duty cycle waveform of FIG. 6a to obtain the PWM firing signal 227 is shown as shaded areas 228'. The amount added to each side of the 50% duty cycle waveform of 6a to obtain the PWM waveform 226 is shown as shaded areas 228. The added and subtracted amounts 228 and 228' correspond to a different value of $K16_A$ and $K5_A$ calculated by the control algorithm. To affect the control illustrated in FIGS. 6a-6c, the control algorithm illustrated in FIGS. 5a-5d is performed at twice the approximately 10 KHz switching frequency of the inverter I. In this manner, the value of, for example, $K16_A$ and $K5_A$ which corresponds to the shaded areas 225 225', 228, 228', can be independently adjusted so that a desired amount can be added or subtracted from each side of the nominal, e.g., 50%, duty cycle.

Figure 7:
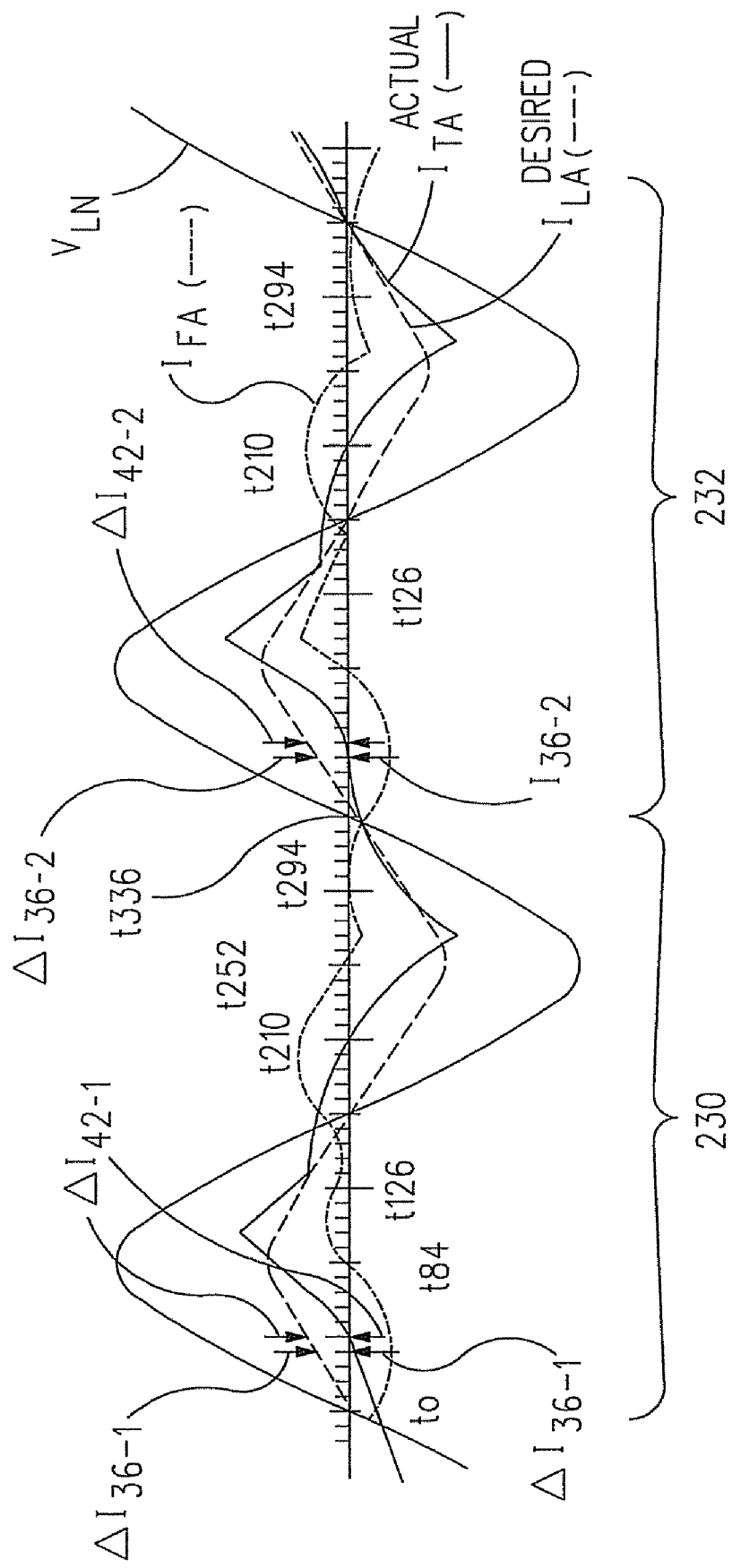
FIG. 7 is an exemplary line-to-neutral voltage and line current with a desired load current and filter current superimposed thereon.

With reference to FIG. 7, and with continuing reference to FIGS. 5a-5d, for each phase of the 3-phase source, the predictor routine 190 obtains 336 samples of the line-to-neutral voltage $V_{AN}^{REF}$, the line current $I_{LA}$ and the filter current $I_{FN}$ for each cycle of the line voltage. The 336 samples correspond to twice the approximately 10 KHz switching frequency of the inverter I divided by the line frequency of 60 Hz. During a first line cycle 230, the difference between the actual load current $I_T^{ACTUAL}$ and the desired line current $I_L^{DESIRED}$, in phase with the line voltage $V_L$, is determined for each of the 336 samples of the line current $I_{LM}$. The predictor routine 190 determines differences between closely adjacent difference currents $\Delta I$. The difference currents are stored in a memory unit for subsequent retrieval. In the absence of changes in the load between the first cycle 230 and a second cycle 232, the actual load current $I_T^{ACTUAL}$ is substantially the same in equivalent segments of time in the first cycle 230 and the second cycle 232. Hence, with knowledge of the difference currents between the actual load current $I_T^{ACTUAL}$ and the desired line current $I_L^{DESIRED}$ at each of the 336 samples during the first cycle 230, a correction can be determined for each equivalent sample in the second cycle 232. For example, the predictor routine 190 determines between difference currents $\Delta I_{36-1}$ and $\Delta I_{42-1}$, at times $t_{36}$ and $t_{42}$, respectively, during the first line cycle 230, a difference $\Delta I_{36-42}$. This difference, $\Delta I_{36-42}$, is stored in a memory unit. At time $t_{36}$ during the second line cycle 232, the difference $\Delta I_{36-42}$ is fetched from the memory unit and provided as value $K11_A$ to step 192 of the control routine 184. The sum of delays introduced by the control routine, and the signal propagation and processing delays results in the difference current value $\Delta I_{36-2}$ and the current corrections applied by the proportional control routine 178 and the integrating slow control 180 being output as filter current $I_{FA}$ at time $t_{42}$ during the second cycle 232. Hence, the predictor routine can determine in advance the PWM modulation to be provided to transistors 10-20, that when combined with the real time PWM modulation provided by the proportional control routine 178 and the integrating slow control routine 180, produce the filter currents $I_{FA}$, $I_{FB}$, and $I_{FC}$ that reduce the phase shift between the line voltages $V_{AN}$, $V_{BN}$, and $V_{CN}$ and line currents $I_{LA}$, $I_{LB}$, and $I_{LC}$, respectively.

The predictor routine 190 also performs weighted averaging on the difference currents, e.g., 234, detected at equivalent times in different cycles. This weighted averaging more heavily weighs recent difference current samples so that the value of $K11_a$ can be adjusted to account for changes in the load.

Figure 8:
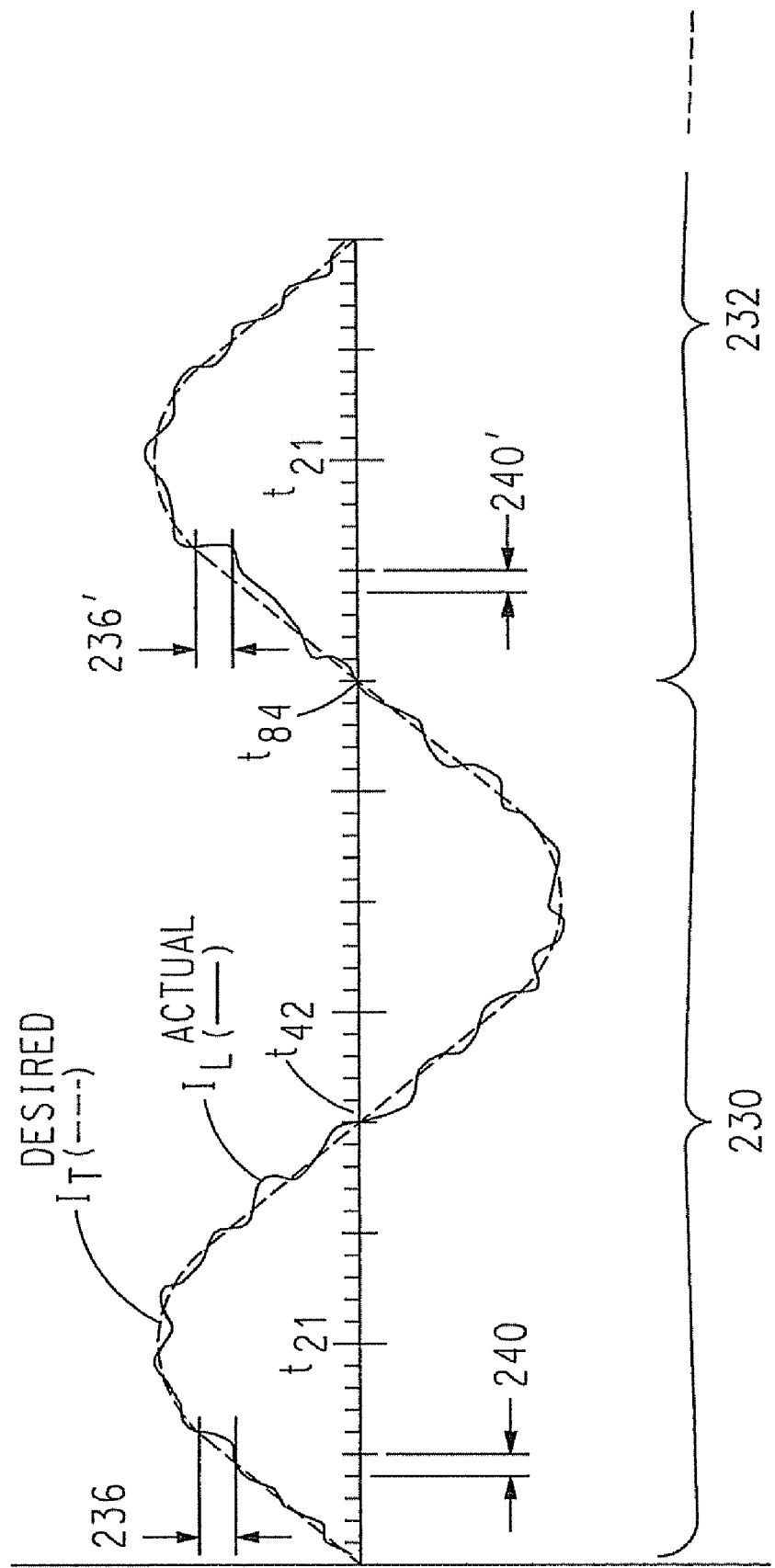
FIG. 8 is an exemplary desired line current and an exemplary actual line current.

With reference to FIG. 8, the integrating slow control routine 180 integrates the difference between the actual line current $I_{LA}^{ACTUAL}$ and the desired line current, $I_L^{DESIRED}$, i.e., difference currents, in 84 equivalent time segments of different line cycles. For example, the difference current 236 in time segment 240 of the first line cycle 230 is integrated with the difference current 236' of time segment 240' in the second line cycle 232. Integrating the difference currents 236 and 236' in equivalent time segments of different cycles enables the adjustment value $A_{ISC}$ to reduce harmonic distortion of the line current $I_{LA}$. Preferably, the integrating slow control routine 180 integrates the difference currents, e.g., 236 and 236', over several line cycles and makes corrections corresponding to the integrated difference currents.

Figure 9:
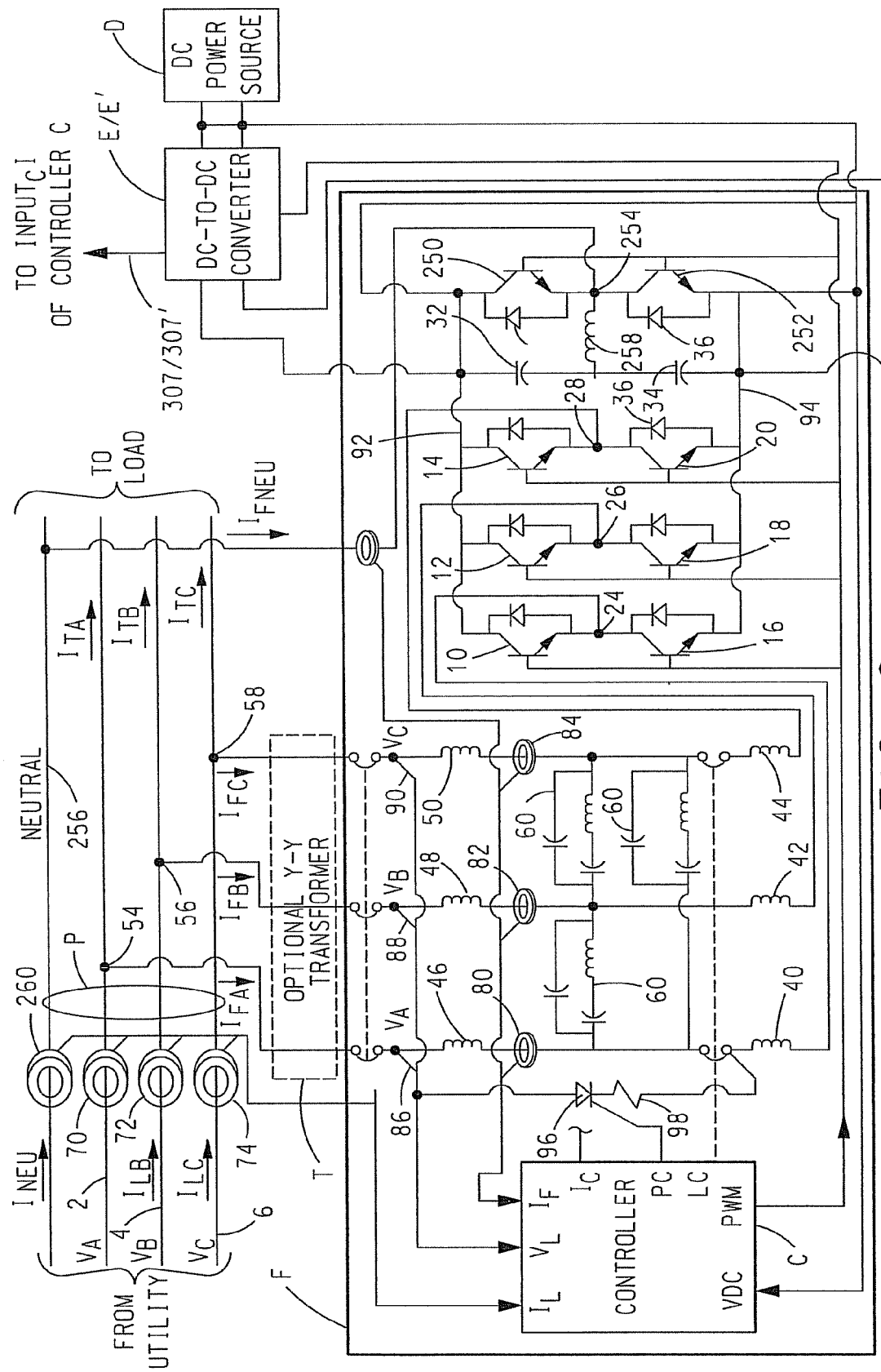
FIG. 9 is a circuit diagram of a distributed generation system in accordance with another embodiment of the invention connected to a 3-phase power line P that includes a neutral.

With reference to FIG. 9, in another embodiment, the inverter I includes transistors 250, 252, connected in series. An emitter terminal of transistor 250 is connected to a collector terminal of transistor 252 to form node 254. Connected between the emitter terminal and the collector terminal of each transistor 250, 252 is a diode 36. Each diode 36 has its anode connected to the emitter terminal and its cathode connected to the collector terminal of the corresponding transistors 250, 252. The node 254 is connected to a neutral line 256 of the power line P. Connected between the node 254 and the junction of capacitors 32-34 is an inductor 258. The remaining circuit elements shown in FIG. 9 are arranged in the same manner as like numbered circuit elements in FIG. 1.

Generally, the inverters I in FIGS. 1 and 9 are operated to controllably supply current to or draw current from lines 2, 4 and 6. Moreover, the inverters I are operated to supply current from the lines 2, 4 and 6 to the capacitors 32-34 to maintain the voltage VDC thereacross at or near the desired voltage level. In the embodiment shown in FIG. 9, current flow in the neutral can be controlled by appropriate PWM modulation of transistors 10-20, 250 and 252. Moreover, transistors 250, 252 and inductor 258 can be utilized to balance the voltage VDC across capacitors 32-34. More specifically, if capacitor 32 is charged greater than capacitor 34, turning on transistor 250 causes current to flow between the terminals of capacitor 32 via transistor 250 and inductor 258. At an appropriate time, transistor 250 is turned off and current flowing through inductor 258, caused by the collapsing magnetic field thereof, flows through capacitor 34 and diode 36 of transistor 252. Hence, charge initially stored in capacitor 32 is transferred to capacitor 34. Similarly, transistor 252 can be turned on and off to transfer charge from capacitor 34 to capacitor 32.

Because the predictor 190 and the integrating slow control 180 as shown are preferably implemented in software, the predictor 190 and the integrating slow control 180 can be separately adjusted. Hence, harmonic currents can be corrected absent correcting phase shifts between line voltages and line current and vice versa. Moreover, while the control algorithm of FIGS. 5a-5d is described as being implemented in software, it may be possible to implement one or more features of the control algorithm in hardware.

In the embodiment of FIG. 9, values for $K13_C$ in FIG. 5c are determined utilizing steps similar to those utilized to determine values for $K13_A$. These additional steps produce the firing signals for transistors 250 and 252. Moreover, current sensor 260 is provided for monitoring the line neutral current $I_{LNEU}$ and sensor 262 is included for monitoring the filter neutral current $I_{FNEU}$.

The filter F may also be utilized with a power line P having only two lines, e.g., $V_A$ and $V_B$. In this arrangement, only two of the line current sensors and filter current sensors are required. Moreover, the control algorithm of FIGS. 5a-5d is modified by omitting the steps utilized to determine the values of $K13_B$ in FIG. 5c, and omitting the PWM firing signals to two of the series connected transistors, e.g., 14 and 20.

In still another embodiment, the filter F may be utilized with a power line P having only two lines, e.g., $V_A$ and $V_B$, to supply power to a 3-phase load. This embodiment is similar to the embodiment shown in FIG. 1 absent one phase, e.g., $V_C$, and one line current sensor, e.g. 74. Moreover, the control algorithm is modified by omitting the steps to determine values for $K8_B$. However, PWM firing signals to all three pairs of series connected transistors are generated to create the extra phase voltage, e.g. $V_C$. Absent the third line, e.g., 6, the line-to-line voltages and lines currents associated with this phase and are not obtainable directly and therefore must be determined by the controller in software.

In a last embodiment, filter F can be utilized to generate a neutral from three lines of AC power. This embodiment utilizes the four pole inverter of the type illustrated in FIG. 9, three line current sensors and four filter current sensors. In this embodiment the control algorithm generates PWM firing signals utilized to selectively drive all four pairs of the transistors shown in FIG. 9.

As can be seen that the active harmonic filter F enables current to be supplied to or drawn from the line at appropriate times to reduce load induced phase shifts between the line voltage and the line current, reduce line current harmonics and improve the balance of currents in the power lines of a polyphase system.

This concludes the description of active harmonic filter F disclosed in U.S. Pat. No. 5,977,660.

As can be seen from the above description, active harmonic filter F is capable of supplying or withdrawing from power line P: (1) real electrical power, (2) 60 Hz reactive electrical power, and (3) harmonic electrical reactive power. The use of active harmonic filter F in this regard is less costly than providing separate units to supply or withdraw each of these electrical powers from power line P. The combined electrical power that active harmonic filter F can supply or withdraw from power line P is equal to the square root of the sum of the squares of these three electrical power and not their algebraic sum. This means that a single active harmonic filter F that simultaneously provides 1 MW of real (not reactive) power, 1 MVA of 60 Hz reactive power, and 1 MVA of harmonic reactive power needs to be 1.73 (i.e., $\sqrt{1^2+1^2+1^2}$) MVA in size, not 3 MVA. If active harmonic filter F needs to supply more of one type of compensation, that type of compensation can be increased at the expense of decreasing one or both of the others, as long as the square root of the sum of the three squared components remains less than or equal to the unit's rating (1.73 MVA in this example). In this way a single mode of compensation could be increased up to the full 1.73 MW/MVA rating of active harmonic filter F, realizing that the other two modes of compensation would be reduced to zero under this circumstance.

The operation of active harmonic filter F in combination with DC power source D and DC-to-DC converter E will now be described.

With reference back to FIG. 1, DC power source D can comprise any suitable and/or desirable energy source, such as, without limitation, a bank of solar cells, a wind turbine, fuel cells, batteries and the like. DC-to-DC converter E can be of any suitable and/or desirable configuration that is capable of converting unregulated DC power output by DC power source D into regulated DC power, and vise versa. Under the control of controller C, DC power can be supplied to or withdrawn from capacitors 32 and 34 of filter F by DC-to-DC converter E in coordination with inverter I in a manner to maintain the voltage across capacitors 32 and 34 at a suitable and/or desirable voltage. Also or alternatively, where DC power source D is comprised of an energy storage device, such as one or more batteries, inverter I can be operated under the control of controller C to charge capacitors 32 and 34, while DC-to-DC converter E can be operated, again under the control of controller C, to charge the energy storage device comprising DC power source D with current from capacitors 32 and 34.

Operating under the control of controller C, the combination of inverter I and DC-to-DC converter E enables DC power generated by DC power source D to be injected into power line P at the same time that filter F is (1) reducing load induced phase shifts between line voltage(s) and the line current(s), (2) reducing line current harmonics and/or (3) improving the balance of currents in the power lines of a polyphase system. To this end, active harmonic filter F converts the DC power stored on capacitors 32 and 34 from DC power source D via DC-to-DC converter E into AC power that can be injected onto power line P. Under the control of controller C, the AC power that active harmonic filter F derives from the DC power source E is almost perfectly sinusoidal and in-phase with the voltage on power lines 16.

As discussed above, inverter I inverts regulated DC voltage received from DC-to-DC converter E into a 3-phase AC voltage that is supplied to lines 2, 4 and 6 of power line P, either directly or, if provided, via transformer T. Since the regulated DC voltage output by DC-to-DC converter E and stored on capacitors 32 and 34 has a greater value than the AC voltage(s) supplied to power line P, inverter I can control the flow of electrical power both to and from capacitors 32 and 34. For example, if the DC voltage impressed on capacitors 32 and 34 starts to rise, controller C2 can control inverter I so that net power is transferred from capacitors 32 and 34 to power line P. Conversely, if the DC voltage impressed on capacitors 32 and 34 starts to fall, controller C can control inverter I so that net power is transferred from power lines 16 to capacitors 32 and 34. In the absence of DC power source D and DC-to-DC converter E, inverter I, under the control of controller C, circulates electrical power between power line P and capacitors 32 and 34. This electrical power is controlled in a manner to eliminate harmonics, correct linear displacement currents, and/or balance currents on line 2, 4 and 6 of power line P.

Figure 10:
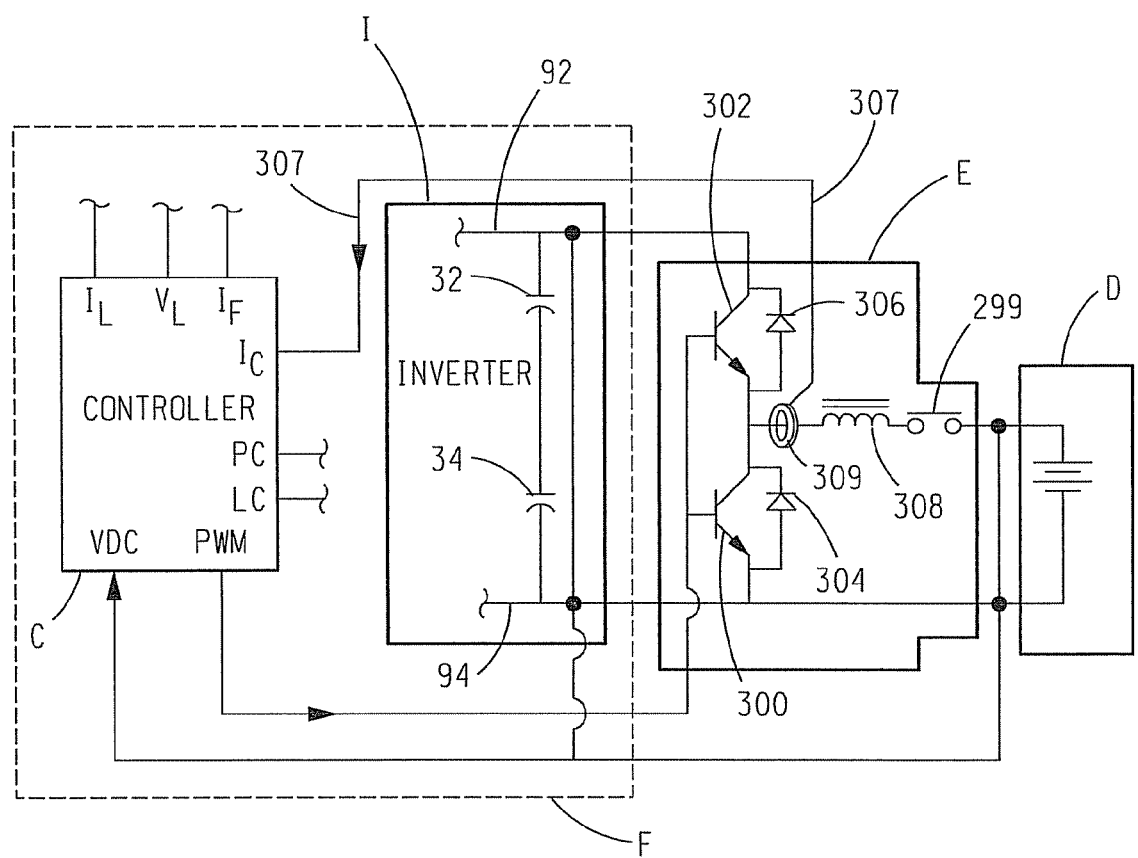
FIG. 10 is a first embodiment DC-to-DC converter E coupled to a portion of the distributed generation system of FIG. 1 or FIG. 9.

With reference to FIG. 10 and with continuing reference to FIG. 1, under the control of controller C, the first embodiment DC-to-DC converter E shown in FIG. 10 can take power from DC power source D and deliver it to capacitors 32 and 34, "stepping up" the nominal voltage of DC power source D to, for example, 780 volts DC. To accomplish this, transistor 300 of DC-to-DC converter E, operating in a so-called step-up chopper mode of operation, is switched on and off via a PWM firing signal output by controller C while transistor 302 remains off The anti-parallel diode 306 of transistor 302 operates as a so-called free-wheeling diode for the step-up chopper mode of DC-to-DC converter E. Each time transistor 300 is turned on, current from DC power source D increases in inductor 308 of DC-to-DC converter E. Each time transistor 300 is turned off, the energy stored in inductor 308 travels as current through anti-parallel diode 306 of transistor 302 to charge capacitors 32 and 34. The current in inductor 308 decreases during this part of the cycle. Under the control of controller C, the process of switching transistor 300 on and off at suitable times for suitable durations continues as necessary to either charge or maintain the charge on capacitors 32 and 34.

As discussed above, the combination of the pre-charge PC output of controller C, SCR 96, resistor 98, breaker BR, inductors 40 and 42, and diodes 36 of transistors 10 and 18 can be utilized for initially charging capacitors 32-34. Thereafter, controller C can be programmed to decide whether to maintain the charge on capacitors 32-34 via inverter I or via DC-to-DC converter E in any suitable and/or desirable manner. For example, if controller C determines by measuring the voltage output by DC power source D that it is unable to maintain or increase the voltage across capacitors 32-34 using DC-to-DC converter E, e.g., when DC power source D is not outputting sufficient electrical power, then controller C can charge capacitors 32-34 via inverter I. Moreover, when DC power source D is outputting sufficient electrical power, if controller C determines by way of voltage and/or current measurements of lines 2, 4 and 6 of power line P made in the manner described above that there is a power outage on one or more of said lines 2, 4 and 6 of power line P, controller C can not only cause inverter I to temporarily supply from the DC electrical power stored on capacitors 32-34 the complete or partial AC power requirements of the load via said one or more lines 2, 4 and 6 of power line P during this outage, but can simultaneously cause capacitors 32-34 to be charged via DC-to-DC converter E and DC power source D. Thus, as can be seen, under the control of controller C, DC-to-DC converter E can be controlled to support inverter I supplying the complete or partial AC power requirements of the load by causing DC-to-DC converter E to charge capacitors 32-34 with energy from DC power source D during a power outage on lines 2, 4 and 6 of power line P.

Also or alternatively, under the control of controller C, DC-to-DC converter E can take DC power stored on capacitors 32-34, e.g., by inverter I, and can deliver this stored DC power to DC power source D in the form of one or more batteries, thus charging them, by "stepping down" the 780 VDC voltage across capacitors 32 and 34 to the voltage of the one or more batteries, e.g., 480 VDC. To accomplish this, transistor 302 of DC-to-DC converter E, operating in a so-called step-down chopper mode of operation, is switched on and off while transistor 300 remains off. The anti-parallel diode 304 of transistor 300 acts as a "free-wheeling" diode for the step-down chopper mode of DC-to-DC converter E. Specifically, when transistor 302 is on, current from capacitors 32-34 increases in inductor 308 and DC power source D. When transistor 302 is turned off, diode 304 provides a free-wheeling path for current in inductor 308 which decreases during this part of the cycle. Controller C senses the decreased voltage in capacitors 32-34 and reacts by drawing power from lines 2, 4 and 6 of power line P to replenish capacitors 32-34. This "charging" function is not needed if DC source 4 is other than one or more batteries. In such a case, transistor 302 can be omitted and diode 306 used alone.

To facilitate controller C operating DC-to-DC converter E in both the step-up and step-down chopper modes of operation, controller C can monitor the voltage across capacitors 32 and 34 and/or the voltage across the output of DC power source D via VDC input(s) of controller C. Also or alternatively, controller C can also monitor current flowing through inductor 308 via a current sensor 309 that is disposed to measure said current and which is coupled to $I_c$ input(s) of controller C. As a function of the monitored voltage(s) and/or the monitored current, controller C can control the firing signals provided to transistor 300 and/or 302 in the manners describe above to effect the step-up and step-down chopper modes of operation of DC-to-DC converter E.

Desirably, DC-to-DC converter E includes a contactor 299 under the control of controller C. When pre-charging capacitors 32 and 34, contactor 299 and contactor 100 of filter F are open. Once capacitors 32 and 34 have been pre-charged to an appropriate pre-charge voltage, contactor 100 is closed as described above. In addition, if controller C determines that DC power source D is outputting a voltage within an expected range, controller C closes contactor 299, thereby establishing an electrical connection between DC power source D and DC-to-DC converter E. If the voltage output by DC power source D is not within the expected range, controller C causes contactor 299 to remain open.

When provided, optional transformer T establishes a fixed relationship between the currents on its primary and secondary sides. Because it is unknown how much the leakage inductance of optional transformer T would affect the performance of the harmonic correction performed by filter F, optional transformer T is desirably designed to have reduced leakage inductance. Leakage inductance is essentially the additional inductance that optional transformer T adds between filter F and lines 2, 4 and 6 of power line P. Such reduced leakage inductance helps by providing additional filtering of the switching frequency currents of inverter I, but hurts by making it more difficult for inverter I to drive higher harmonic frequency currents to power lines 16. As will be seen hereinafter, the data collected during a test of energy converter 6 shows that energy converter 6 is able to correct up through and including the $31^{st}$ harmonic frequency.

Several tests were performed on distributed generation system A. The following is a summary of the results. All of the data was taken using the same load, so that comparisons can be made. The line currents $I_{LA}$, $I_{LB}$ and $I_{LC}$ drawn by the load had about 32% harmonic distortion. The fundamental 60 Hz current drawn by the load also had some linear displacement (i.e., a lagging power factor). Current to the load was also imbalanced so that about 50 amps was drawn on $I_{LA}$ and $I_{LC}$, while only 40 amps was drawn on $I_{LB}$. Four sets of data (FIGS. 11 through 14) indicate the observed results when energy converter 6 was operating in 4 different modes.

FIG. 11 shows data collected with filter F performing reactive power correction, current balancing and linear phase correction, with DC-to-DC converter E turned off and with DC power source D supplying no power to filter F during this test. The first line of FIG. 11 shows the Line-to-Line voltages $V_{AB}$, $V_{BC}$ and $V_{CA}$ of lines 2, 4 and 6 of power line P and the RMS current $I_{FA}$, $I_{FB}$ and $I_{FC}$ supplied by filter F (DP-M_AMPS) to phases A, B and C (lines 2, 4 and 6) of power line P. The $2^{nd}$ line shows the line currents $I_{LA}$, $I_{LB}$ and $I_{LC}$ from the utility (LINE_AMPS) and the load currents (LOAD_AMPS) $I_{TA}$, $I_{TB}$ and $I_{TC}$ drawn by the load coupled to phases A, B and C, respectively, of power line P. The $3^{rd}$ line shows for phases A, B and C of power line P, the harmonic current distortion as a percentage of total RMS current of the line (LINE_THD %) and the load (LOAD_THD %). The $4^{th}$ line shows for phases A, B and C of power line P, the actual total RMS current of the harmonics for the line and the load. The $5^{th}$ line shows the kilowatts, kilovars, and power factor of the line and the load. The $6^{th}$ line shows the frequency of the line and the Regulated DC voltage of filter F (in this example, approximately 820 volts). The second column of the $8^{th}$ line shows the DC power source's D (battery) voltage (volts), current (amps), and power (kilowatts); where positive current and power indicate that DC power source D is supplying power and negative values indicate DC power source D is being charged by the DC-to-DC converter E.

As can be seen in FIG. 11, the load currents for phases A, B and C ($I_{TA}$, $I_{TB}$ and $I_{TC}$) are unbalanced (50.5, 40.1, and 52.4 amps). As shown in the $3^{rd}$ line, second column, the load currents for phases A, B and C ($I_{TA}$, $I_{TB}$ and $I_{TC}$) include substantial harmonics (about 32% each). Lastly, as shown in the $5^{th}$ line, second column, the load has a power factor of 0.904.

On the other hand, as shown in the $2^{nd}$ line, first column, the line currents for phases A, B and C ($I_{LA}$, $I_{LB}$ and $I_{LC}$) are balanced at about 44 amps each. As shown in the $4^{th}$ line, first column, there is very little harmonic current coming from the utility (between 1.8% and 2.6% of the load current shown in the $2^{nd}$ line, second column). Lastly, as shown in the $5^{th}$ line, first column, the power factor seen by the utility is 0.999 out of a possible 1.000. Thus, as can be seen, filter F is making a relatively reactive load with harmonic current look like an ideal balanced, purely resistive load to the utility.

FIG. 12 shows data taken under the same conditions as FIG. 11 except that DC-to-DC converter E is activated so that 11.6 KW of power is being supplied to lines 2, 4 and 6 of power line P. The result is that the line currents $I_{LA}$, $I_{LB}$ and $I_{LC}$ from the utility (LINE_AMPS), shown in the $1^{st}$ line, first column drops from about 44 amps in FIG. 11 to about 31 amps in FIG. 12. Although 11.6 KW would require almost 14 amps of RMS current on each phase to be generated by inverter I, the $1^{st}$ line, second column, of FIG. 12 shows that filter F is only outputting about the same or a slightly higher current (DPM_AMPS), 28.8, 16.9, and 27.2 on each phase $I_{FA}$, $I_{FB}$ and $I_{FC}$ than it did when only harmonic and reactive correction was being performed in the example of FIG. 11 (see $1^{st}$ line, second column of FIG. 11). This illustrates how performing reactive and harmonic correction in combination with real power generation can be accomplished more efficiently than using separate pieces of equipment.

FIG. 13 shows data taken when the batteries comprising DC source 4 were being charged with 2.5 KW of power from power line P. During this test, power line currents (FIG. 13, $2^{nd}$ line, first column) rise a few amps over that shown in FIG. 11 since this is where the energy comes from to charge the batteries.

Lastly, FIG. 14 shows data taken when DC-to-DC converter E is turned off and only harmonic current correction is performed by filter F. This case is similar to FIG. 11 except that current balancing and linear phase correction in power line P is not being performed, the harmonic currents $I_{FA}$, $I_{FB}$ and $I_{FC}$ (FIG. 14, $4^{th}$ line, first column) drawn from phases A, B and C of power line P are still low, but the line currents $I_{LA}$, $I_{LB}$ and $I_{LC}$ (FIG. 14, $2^{nd}$ line, first column) drawn from phases A, B and C of power line P are no longer balanced and the line power factor PF (FIG. 14, $5^{th}$ line, first column) has been reduced to 0.958. The current supplied by filter F (DP-M_AMPS) (FIG. 14, $1^{st}$ line, second column) is lower than shown that in FIG. 11 because current balancing and linear phase correction are not being performed.

FIGS. 15A-20B show detailed data taken with a Fluke 41B harmonics meter for phase A of power line P. This data was taken with filter F performing reactive power correction, current balancing and linear phase correction, with optional transformer T in line between filter F and lines 2, 4 and 6 of power line P, with DC-to-DC converter E turned off and with DC power source D supplying no power to filter F as discussed above in connection with FIG. 11. FIGS. 15A, 16A, 17A, 18A, 19A and 20A comprise load current ($I_{TA}$) related parameters while FIGS. 15B, 16B, 17B, 18B, 19B and 20B comprise line current ($I_{LA}$) related parameters.

Figures 15A, 15B:
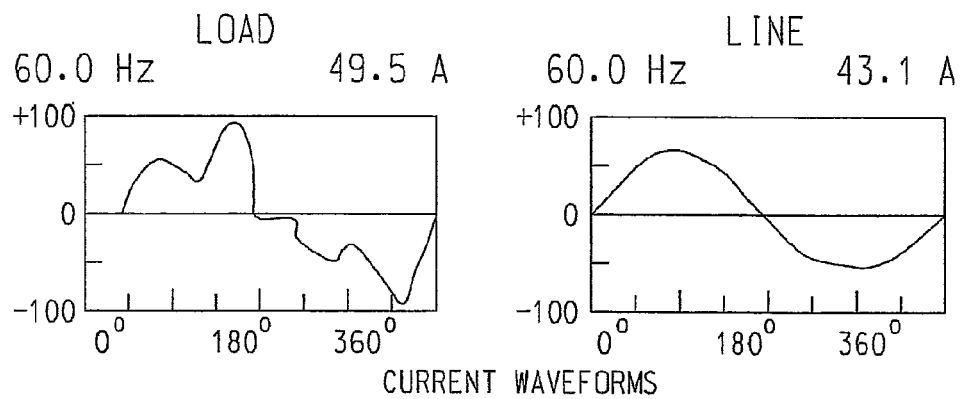
FIGS. 15A-15B are load $I_T$ and line $I_L$ current waveforms showing the current delivered to the load and the current seen by the utility, respectively, for one of the power lines of FIG. 1.

FIG. 15A shows the actual load current $I_{TA}$ waveform. The load current $I_{TA}$ is obviously distorted with harmonics and is slightly lagging. The line current $I_{LA}$ shown in FIG. 15B is almost a perfect sine wave.

Figures 16A, 16B:
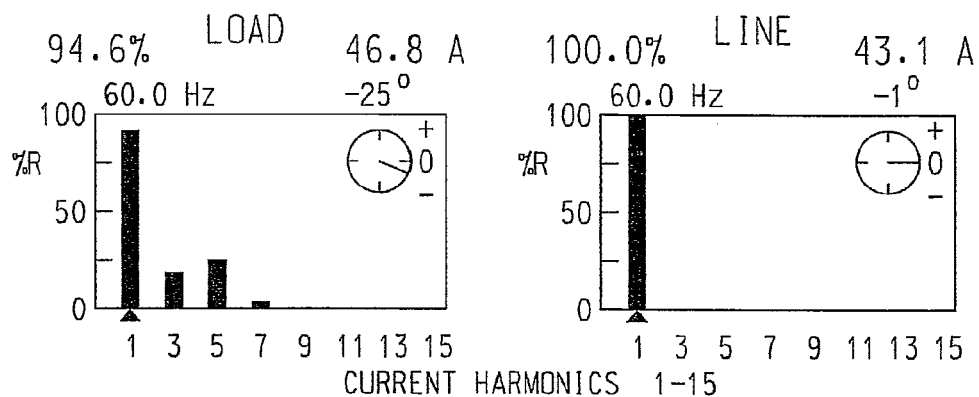
FIGS. 16A-16B are the $1^{st}$ through $15^{th}$ harmonics of the load $I_T$ and line $I_L$ current waveforms show in FIGS. 15A-15B.

FIG. 16A shows the first 15 harmonics that appear on the load. The load current $I_{TA}$ has sizeable $3^{rd}$, $5^{th}$, and $7^{th}$ harmonics, whereas the line current $I_{LA}$ shown in FIG. 16B is absent these harmonics.

Figures 17A, 17B:
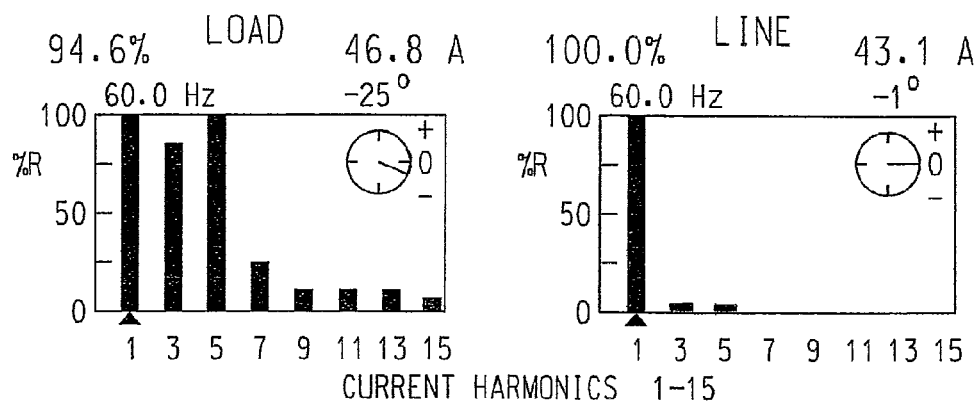
FIGS. 17A-17B are higher resolution views of the $1^{st}$ through $15^{th}$ harmonics of the load $I_T$ and line $I_L$ current waveforms show in FIGS. 16A-16B.

FIGS. 17A, 17B, 18A and 18B are higher resolution views of the harmonics produced by the waveform that produced the lower resolution views of FIGS. 16A and 16B. FIGS. 17A and 18A show the $1^{st}$ through the $31^{st}$ harmonics of line current $I_{TA}$, which has observable harmonics up through the $27^{th}$ harmonic. The load current $I_{LA}$ shown in FIGS. 17B and 18B have minor observable amounts of harmonics only at the $3^{rd}$ and $5^{th}$ harmonic.

The fact that higher frequency harmonics are reduced by filter F verifies that the leakage inductance of transformer T is not preventing correction of higher harmonic currents. FIG. 19A shows that the load current $I_{TA}$ has 32.4% harmonic distortion and a crest factor (ratio of peak value to RMS) of 1.80, whereas the line current $I_{LA}$ shown in FIG. 19B has only 1.2% harmonic distortion and a crest factor of 1.42, which is very close to the ideal value of 1.414. FIG. 20A shows the power contribution of this single phase. Since there are 3 phases, this represents roughly ⅓ of the total power. As shown in FIG. 20A, the load has an overall power factor of 0.86 (due to harmonic currents and linear displacement) and displacement power factor of 0.90 (due to linear displacement only) compared with the ideal power factor of 1.00 seen by the utility shown in FIG. 20B.

In switching circuits, such as DC-to-DC converter E and Inverter I, higher switching frequencies are desired in order to improve operational performance and reduce the size and cost of the filtering components needed in filter F. However, higher switching frequencies result in higher losses in the switching circuits. A balance therefore must be found between switching frequency, system power losses, and size of the filtering components of filter F.

High power versions of filter F may require paralleling switching components to achieve such higher power levels. Instead of simply paralleling these components and identically controlling each paralleled component, the control algorithm implemented by controller C can be adapted so that a lower switching frequency can be used without increasing the size or cost of the filtering components and without sacrificing operational performance. Such lower switching frequency results in higher system operational efficiency. This control algorithm would control each paralleled switching device at the same frequency, but would shift in time the turn on/turn off of each device.

Figure 21:
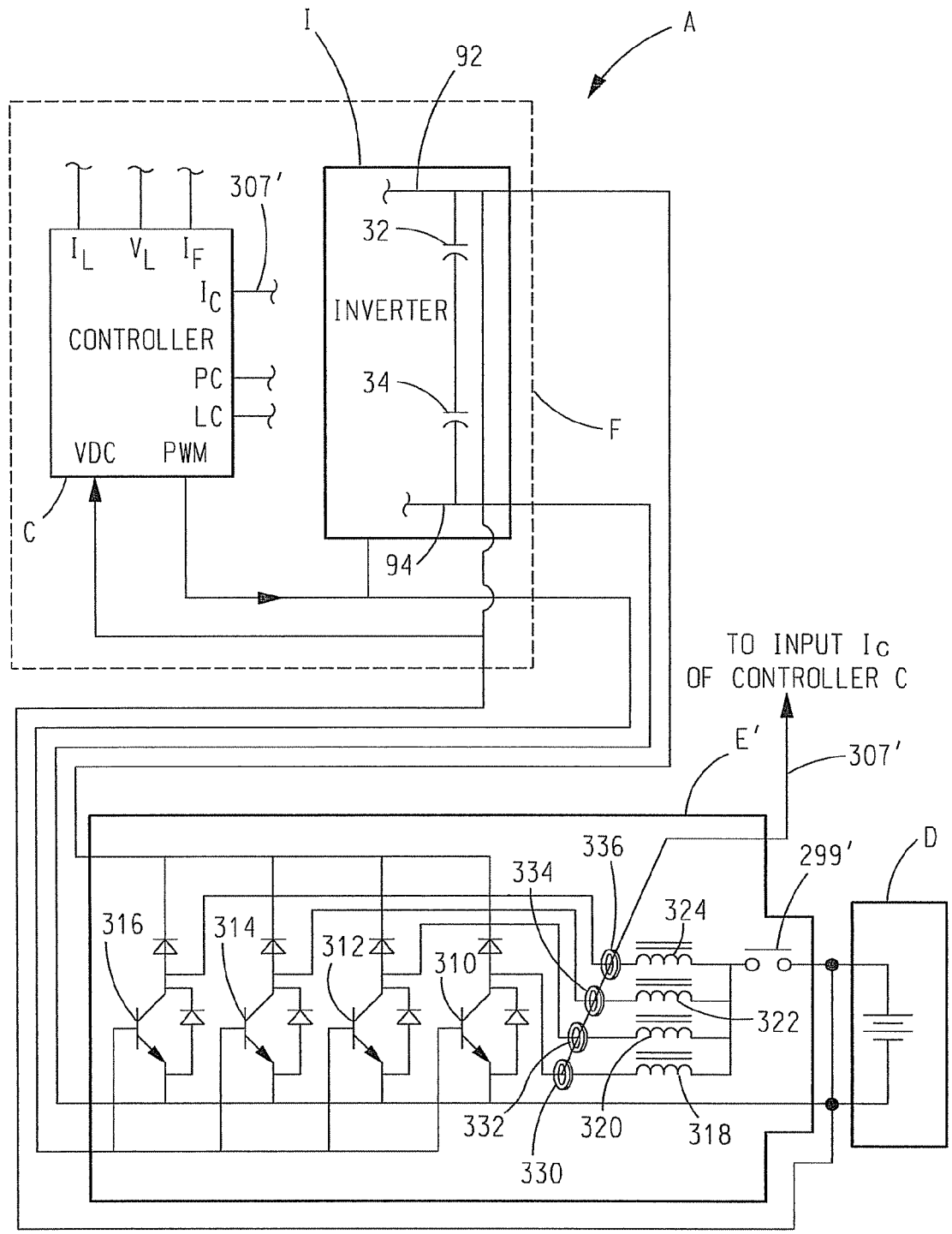
FIG. 21 is a second embodiment DC-to-DC converter E' coupled to a portion of the distributed generation system of FIG. 1 or FIG. 9.

With reference to FIG. 21, alternate embodiment DC-to-DC converter E' (step-up chopper) includes four transistors 310, 312, 314, 316 in parallel and with four inductors 318, 320, 322, 324 coupled between the collector terminals of transistors 310, 312, 314, 316, respectively, and an input/output of DC power source D. Current sensors 330, 332, 334, 334 are disposed to measure currents flowing in inductors 318, 320, 322, 324, respectively, and to provide an indication of these currents to $I_c$ input(s) of controller C. Under the control of controller C, each transistors 310, 312, 314, 316 is turned on and off at ¼ of the frequency required for transistor 300 of the DC-to-DC converter E shown in FIG. 10, with all four transistors 310, 312, 314, 316 being controlled in unison. For example, transistor 312 would be switched on and off at ¼ of a switching period after transistor 310; transistor 314 would be delayed another ¼ of a switching period; and transistor 316 would be delayed yet another ¼ of a switching period. Since the switching frequency is ¼ of what would normally be used, the magnitude of the ripple current in each inductor 318, 320, 322, 324 coupled to transistors 310, 312, 314, 316, respectively, is four times what it would normally be. However, since transistors 310, 312, 314, 316 are turned on and off at equally spaced, different times within the switching period, the cumulative ripple current is at four times the switching frequency and has a magnitude that is no greater than if all four transistors 310, 312, 314, 316 were controlled in unison but at the original normal switching frequency. Accordingly, with similarly sized filter components of filter F, DC-to-DC converter E' achieves similar performance to DC-to-DC converter E but with ¼ the switching losses of DC-to-DC converter E. Filter F includes one or more of the following filter components: traps/bypasses 60 and/or high frequency block inductors 46, 48 and 50. These one or more filter components define means for filtering that filter(s) out signals (noise) caused by operation of the inverter that are not related to reducing load induced phase shifts between the line voltage and the line current, reducing line current harmonics, and/or balancing currents in the AC power lines of a polyphase AC electrical distribution system.

To facilitate controller C operating DC-to-DC converter E' in both the step-up and step-down chopper modes of operation, controller C can monitor the voltage across capacitors 32 and 34 and/or the voltage across the output of DC power source D via VDC input(s) of controller C. Also or alternatively, controller C can also monitor current flowing through inductors 318, 320, 322, 324 via current sensors 330, 332, 334, 334. As a function of the monitored voltages and/or the monitored currents, controller C can control the firing signals provided to transistors 310, 312, 314, 316 in a manner to effect step-up and step-down chopper modes of operation of DC-to-DC converter E'.

The disclosure of DC-to-DC converter E' including four transistors 310, 312, 314, 316 in parallel and four inductors 318, 320, 322, 324 is not to be construed as limiting the invention, however, since it is envisioned that any number of transistors and inductors connected in the manner shown in FIG. 21 can be used to reduce the switching losses of the transistors over the use of a single transistor and inductor. For example, two transistors in parallel, turned on and off at equally spaced, different times within the switching period, and two inductors can be utilized to reduce switching losses to ½ of the switching losses of DC-to-DC converter E; three transistors in parallel, turned on and off at equally spaced, different times within the switching period, and three inductors can be utilized to reduce switching losses to ⅓ of the switching losses of DC-to-DC converter E; and so forth.

Figure 22:
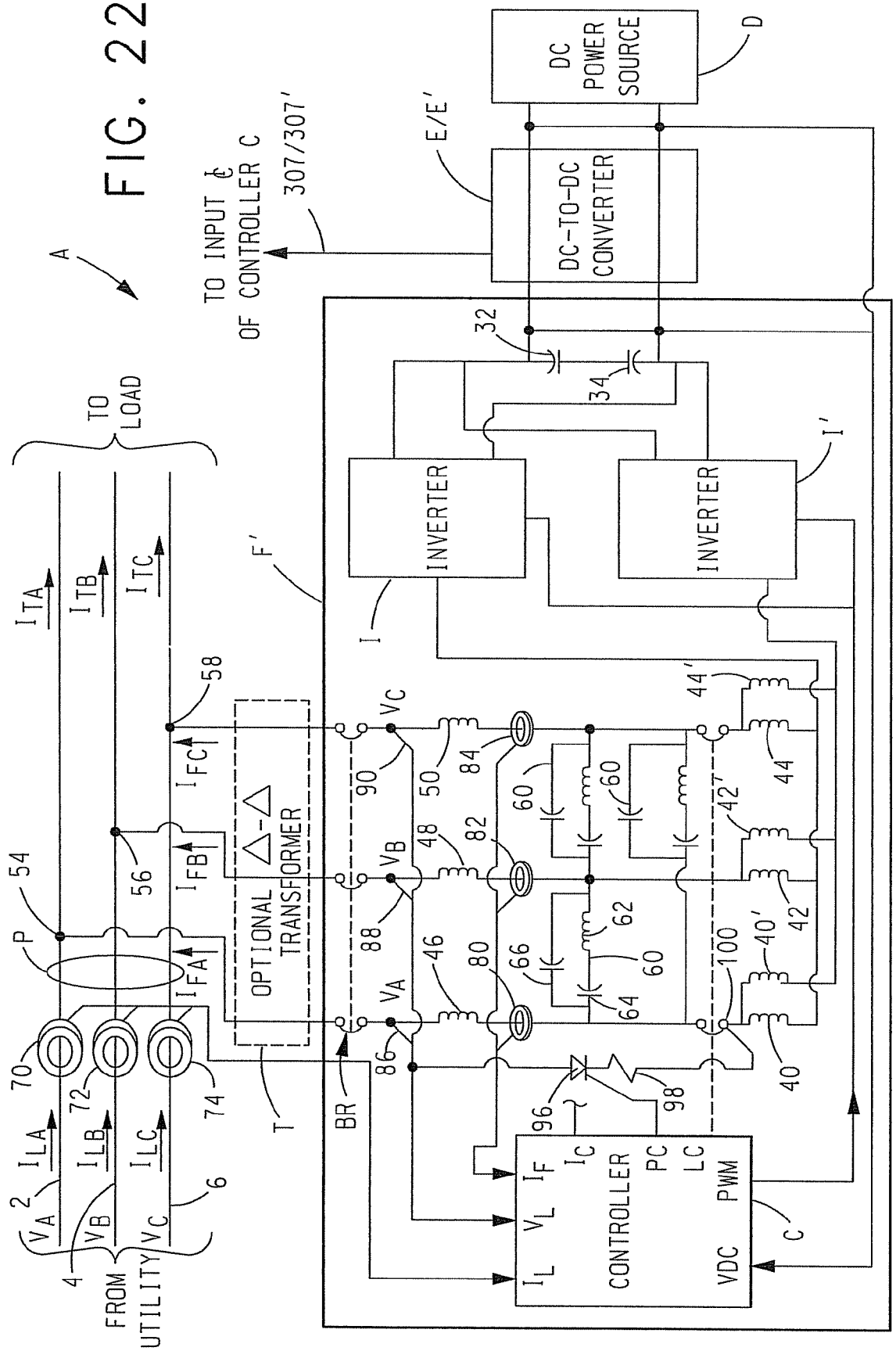
FIG. 22 is a circuit diagram of a distributed generation system in accordance with yet another embodiment of the invention having two inverters I and I' connected to a 3-phase power line.

With reference to FIG. 22 and with continuing reference to FIG. 1, an alternate embodiment filter F' with two inverters I and I' in parallel is shown. Since inverter I' is similar to inverter I show in FIG. 1, details regarding the internal components of inverters I and I' have been omitted for simplicity.

In a system with a single inverter I, a switching frequency of, for example, without limitation, 10 KHz is utilized to achieve the desired performance. With the two paralleled inverter I and I' system shown in FIG. 22, the transistors 10-20 of each inverter I and I' can be turned on and off at ½ of the frequency (5 KHz in this example) to achieve the same performance as switching the transistors 10-20 of a single inverter system I. For example, the transistors 10-20 in inverter I' would be switched on and off at ½ of a switching period after the corresponding transistors 10-20 in inverter I. Since the switching frequency is ½ of what would normally be used with a single inverter I system, the ripple current in each inductor 40, 42, 44, 40', 42', and 44' is 2 times the magnitude that it would be if the switching frequency were the higher 10 KHz. However, since transistors 10-20 in inverter I' are turned on and off ½ of a switching period after transistors 10-20 in inverter I, the cumulative ripple current in each phase (θA, θB and θC) is 2 times the switching frequency and has a magnitude that is no greater than that produced by a single inverter system operated at 10 KHz. Accordingly, with similarly sized filter components, filter F' in FIG. 22, achieves similar performance with half the inverter switching losses achieved with the filter F shown in FIG. 1.

The invention has been described with reference to the preferred embodiments. Obvious modifications and alterations will occur to others upon reading the preceding detailed description. For example, while the various embodiments have been described with reference to the use of capacitors 32 and 34, it is envisioned that capacitors 32 and 34 can be replaced with a single capacitor or more than two capacitors as deemed suitable and/or desirable. Moreover, herein, controller C is described as outputting PWM firing signal to control any embodiment inverter described herein and any embodiment DC-to-DC converter E described herein. However, this is not to be construed as limiting the invention since it is envisioned that any suitable and/or desirable firing signals can be utilized for controlling the operation of any embodiment inverter described herein and any embodiment DC-to-DC converter E described herein. It is intended that the invention be construed as including all such modifications and alterations insofar as they come within the scope of the appended claims or the equivalents thereof.

The invention claimed is:

1. A distributed generation system connectable to an AC power line that provides AC electrical power from a source to a load, the distributed generation system comprising:
   a source of stored DC energy;
   a controller operative for:
   detecting line voltage and line current of the AC power line and for providing a first set of firing signals related to the AC line voltage and/or the AC line current, and
   detecting an amount of energy stored in the source of stored DC energy and for providing a second set of firing signals related thereto;
   an inverter connected between the power line and the source of stored DC energy and connected to receive the first set of firing signals from the controller;
   a DC power source; and
   a converter connected between the DC power source and the source of stored DC energy and connected to receive the second set of firing signals from the controller, wherein:
   the controller is operative for controlling the firing of the first and second sets of firing signals to deliver electrical power from the DC power source to the AC power line, or vice versa, via the source of stored DC energy; and
   the controller is further operative for controlling the firing of the first and second sets of firing signals to maintain the source of stored DC energy at a voltage greater than a peak AC line voltage and a voltage of the DC power source.

2. The distributed generation system of claim 1, wherein the controller is further operative for causing the inverter to perform at least one of the following:
   reducing load induced phase shifts between the line voltage and the line current;
   reducing line current harmonics; or
   balancing currents in AC power lines of a polyphase AC electrical distribution system.

3. The distributed generation system of claim 2, further including means for filtering connected between the inverter and the power line for filtering out signals caused by operation of the inverter that are not related to reducing load induced phase shifts between the line voltage and the line current, reducing line current harmonics, and/or balancing currents in the AC power lines of a polyphase AC electrical distribution system.

4. The distributed generation system of claim 1, further including a transformer connected between the inverter and the power line for physically isolating the inverter from the power line while enabling the inverter and the power line to be in electrical communication.

5. The distributed generation system of claim 1, wherein, during delivery of electrical power from the source of DC power source to the AC power line, the controller controls the first and second sets of firing signals to cause the inverter to deliver the electrical power stored on the source of stored DC energy to the AC power line and to cause the converter to deliver electrical power from the DC power source to the source of stored DC energy.

6. The distributed generation system of claim 1, wherein:
   the source of stored DC energy includes a capacitor; and
   the DC power source includes a battery.

7. A distributed generation system connectable to an AC power line that provides AC electrical power from a source to a load, the distributed generation system comprising:
   means for storing DC electrical power at a first voltage;
   means for inverting DC electrical power stored by the means for storing DC electrical power into AC electrical power that is delivered to the AC power line and for converting AC electrical power on the AC power line into DC electrical power for storage by the means for storing DC electrical power;
   means for generating DC electrical power at a second voltage; and
   means for converting the second voltage of the means for generating DC electrical power to the first voltage of the means for storing DC electrical power and vice versa, wherein the first voltage is greater than the second voltage and a peak voltage of the AC electrical power that is delivered to the AC power line.

8. The distributed generation system of claim 7, further including means for controlling the operation of the means for inverting to controllably transfer electrical power to or from the means for storing DC electrical power in a manner to reduce load induced phase shifts between the line voltage and the line current, reduce line current harmonics on the AC power line or balance currents in AC power lines of a polyphase AC electrical distribution system.

9. The distributed generation system of claim 8, further including means for controlling the operation of the means for converting to controllably transfer electrical power to or from the means for storing DC electrical power in a manner to maintain the first voltage within a predetermined limit.

10. The distributed generation system of claim 7, wherein:
    the means for storing DC electrical power includes a capacitor; and
    the means for generating DC electrical power includes a battery.

11. The distributed generation system of claim 7, further including means for physically isolating the means for inverting from the AC power line while enabling the means for inverting and the AC power line to be in electrical communication.

12. The distributed generation system of claim 8, further including means for filtering signals caused by operation of means for inverting that are not related to reducing load induced phase shifts between the line voltage and the line current, reducing line current harmonics, and/or balancing currents in the AC power lines of a polyphase AC electrical distribution system.

13. A distributed generation system connectable to an AC power line that provides AC electrical power from a source to a load, the distributed generation system comprising:
    a DC electrical power source;
    means for storing DC electrical power;
    a converter operative for converting electrical power stored in the DC electrical power source at a first voltage to a second, greater voltage for storage in the means for storing DC electrical power;
    an inverter operative for converting electrical power stored in the means for storing DC electrical power at the second voltage into AC electrical power having a peak voltage less than the second voltage; and
    a controller operative for controlling the operation of the converter and the inverter to deliver electrical power stored in the DC electrical power source to the means for storing DC electrical power for delivery as AC electrical power to the AC power line.

14. The distributed generation system of claim 13, wherein the controller is further operative for delivering the AC electrical power to the AC power line in a manner that:
    reduces load induced phase shifts between the line voltage and the line current;

reduces line current harmonics; and/or balances currents in AC power lines of a polyphase AC electrical distribution system.

15. The distributed generation system of claim 13, wherein:

the means for storing DC electrical power includes a capacitor; and the DC electrical power source includes a battery.

16. The distributed generation system of claim 13, wherein the controller is further operative for controlling the operation of the converter and the inverter to deliver electrical power from the AC power line to the means for storing DC electrical power for delivery to the DC electrical power source.

17. The distributed generation system of claim 13, wherein the DC electrical power source includes one or more of a bank of solar cells or fuel cells, a wind turbine, or batteries.

18. The distributed generation system of claim 1, wherein the controller is further operative for causing the inverter to supply either real power, reactive power, or harmonic reactive power to the AC power line up to a limit which is the square root of the sum of the squares of the maximum real power, the maximum reactive power, and the maximum harmonic reactive power that the inverter is capable of simultaneously supplying to the AC power line.

19. The distributed generation system of claim 7, wherein the maximum real power, the maximum reactive power, or the maximum harmonic reactive power that the means for inverting can individually supply to the AC power line by decreasing the supply of one or both said other powers to the AC power line is no more than the square root of the sum of the squares of the maximum real power, the maximum reactive power, and the maximum harmonic reactive power that the means for inverting can simultaneously supply to the AC power line.

20. The distributed generation system of claim 13, wherein a maximum value of each of the real power, the reactive power, and the harmonic reactive power that the inverter can individually supply to the AC power line is:

(1) greater than a maximum value of said power that can be supplied to the AC power line when the inverter is simultaneously supplying maximum real power, maximum reactive power, and maximum harmonic reactive power to the AC power line; and (2) no more than a square root of the sum of the squares of said maximum real power, maximum reactive power, and maximum harmonic reactive power that can be simultaneously supplied to the AC power line.

* * * * *

UNITED STATES PATENT AND TRADEMARK OFFICE
CERTIFICATE OF CORRECTION

PATENT NO. : 7,834,480 B2  Page 1 of 1
APPLICATION NO. : 12/143259
DATED : November 16, 2010
INVENTOR(S) : Mandalakas et al.

It is certified that error appears in the above-identified patent and that said Letters Patent is hereby corrected as shown below:

Column 2, Line 16, "stored DC enemy" should read -- stored DC energy --

Column 2, Line 22, "to either deliver electrical" should read -- to deliver electrical --

Signed and Sealed this
Twenty-second Day of March, 2011

David J. Kappos
*Director of the United States Patent and Trademark Office*